(12) United States Patent
Iguchi et al.

(10) Patent No.: US 9,177,683 B2
(45) Date of Patent: Nov. 3, 2015

(54) SCINTILLATOR PANEL AND METHOD FOR MANUFACTURING SCINTILLATOR PANEL

(75) Inventors: Yuichiro Iguchi, Shiga (JP); Tsubasa Hamano, Shiga (JP); Yasuhiro Kobayashi, Shiga (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

(21) Appl. No.: 14/119,306

(22) PCT Filed: May 25, 2012

(86) PCT No.: PCT/JP2012/063441
§ 371 (c)(1),
(2), (4) Date: Nov. 21, 2013

(87) PCT Pub. No.: WO2012/161304
PCT Pub. Date: Nov. 29, 2012

(65) Prior Publication Data
US 2014/0091235 A1    Apr. 3, 2014

(30) Foreign Application Priority Data
May 26, 2011  (JP) .................................. 2011-117712

(51) Int. Cl.
*G21K 4/00*    (2006.01)
*G01T 1/20*    (2006.01)
*C03C 3/00*    (2006.01)

(52) U.S. Cl.
CPC ... *G21K 4/00* (2013.01); *C03C 3/00* (2013.01); *G01T 1/20* (2013.01)

(58) Field of Classification Search
CPC .......... G21K 4/00; C09D 5/22; G01T 1/2002; G01T 1/20; H01J 29/24; H01J 29/28; H01J 29/864; H01J 2329/864; H01J 29/028; H01J 31/127; H01J 9/242; H01J 11/12; H01J 11/36; H01J 11/24; H01J 2211/245; H01J 11/44; C03C 3/00
USPC ............................... 250/487.1; 313/292, 582
See application file for complete search history.

(56) References Cited

U.S. PATENT DOCUMENTS 6,043,604 A * 3/2000 Horiuchi et al. .............. 313/582

FOREIGN PATENT DOCUMENTS

| JP | 05-060871 | 3/1993 |
| JP | 05-188148 | 7/1993 |

(Continued)

OTHER PUBLICATIONS

Yuichiro et al. "Technology for Forming of Barrier Ribs on Plasma Display Panel (PDP) by Applying a Phtosensitive Glass Paste" 2004, The Chemical Society of Japan, 1613-1625.*

(Continued)

*Primary Examiner* — Casey Bryant
*Assistant Examiner* — Mamadou Faye
(74) *Attorney, Agent, or Firm* — Ratnerprestia

(57) ABSTRACT

A scintillator panel including: a plate-like substrate; a grid-like barrier rib provided on the substrate; and a scintillator layer composed of a phosphor filled in cells divided by the barrier rib, wherein the barrier rib is formed of a material which is mainly composed of a low-melting-point glass containing 2 to 20% by mass of an alkali metal oxide. The scintillator panel is provided with a narrow barrier rib with high accuracy in a large area, and the scintillator panel has high luminous efficiency, and provides sharp images.

11 Claims, 1 Drawing Sheet

(56) References Cited

FOREIGN PATENT DOCUMENTS

| | | | |
|---|---|---|---|
| JP | 2011-007552 | | 1/2011 |
| JP | 2011021924 A | * | 2/2011 |
| JP | 2011-188148 | | 9/2011 |
| WO | WO 03/67282 | | 8/2003 |

OTHER PUBLICATIONS

Translated from Japanese to English of the Japanese foreign Patent JP 2011021924A.*

International Search Report for PCT/JP2012/063441, Japanese Patent Office, Jun. 19, 2012.

* cited by examiner

SCINTILLATOR PANEL AND METHOD FOR MANUFACTURING SCINTILLATOR PANEL

CROSS REFERENCE TO RELATED APPLICATIONS

This is the U.S. National Phase application of PCT International Application No. PCT/JP2012/063441, filed May 25, 2012, and claims priority to Japanese Patent Application No. 2011-117712, filed May 26, 2011, the disclosures of each of these applications being incorporated herein by reference in their entireties for all purposes.

FIELD OF THE INVENTION

The present invention relates to a scintillator panel which constitutes a radiation detector that is used for a medical diagnostic apparatus, a nondestructive inspection instrument and the like.

BACKGROUND OF THE INVENTION

X-ray images using films have been widely used heretofore in medical settings. However, the X-ray image using a film provides analog image information, and in recent years, digital radiation detectors such as computed radiography (CR) and flat panel radiation detectors (flat panel detectors: FPDs) have been developed.

In a flat panel X-ray detector (FPD), a scintillator panel is used for converting a radiation into visible light. The scintillator panel contains an X-ray phosphor such as cesium iodide (CsI), the X-ray phosphor emits visible light in response to an applied X-ray, and the emitted light is converted into an electric signal by a TFT or a CCD to thereby convert X-ray information into digital image information. However, the FPD has a problem of low S/N ratio. This is attributable to scattering of visible light by the phosphor itself when the X-ray phosphor emits light, etc. For reducing influences of the scattering of light, methods of filling a phosphor in cells divided by a barrier rib have been proposed (Patent Documents 1 to 4).

However, the method which has been heretofore used as a method for forming the barrier rib is a method of etching a silicon wafer, or a method in which a glass paste, a mixture of a pigment or a ceramic powder and a low-melting-point glass powder, is pattern-printed in multiple layers using a screen printing method, and then fired to form a barrier rib pattern. In the method of etching a silicon wafer, the size of a scintillator panel that can be formed is restricted by the size of a silicon wafer, and a scintillator panel having a large size of, for example, 500 mm square cannot be obtained. A plurality of small-size panels should be arranged for making a large-size panel, but production of a scintillator panel in this way is difficult in terms of accuracy, and it is difficult to prepare a large-area scintillator panel.

In the multi-layer screen printing method using a glass paste, processing of high accuracy is difficult due to a dimensional variation of a screen printing plate, etc. Further, when multi-layer screen printing is performed, a definite barrier rib width is required for enhancing the strength of a barrier rib pattern in order to prevent destructive defects of the barrier rib pattern. When the width of the barrier rib pattern increases, a space between barrier ribs becomes relatively small, so that a volume available for filling a phosphor decreases, and the filling amount is not uniform. Therefore, a scintillator panel obtained in this method has the disadvantage that the amount of an X-ray phosphor is so small that the luminescence is reduced, and luminous unevenness occurs. This makes it difficult to photograph sharp images in photographing in a low radiation dose.

That is, for preparing a scintillator panel which has high luminous efficiency and provides sharp images, a technique for processing a barrier rib, which is capable of processing the barrier rib with high accuracy over a large area and narrowing the width of the barrier rib, is required.

Patent Documents

Patent Document 1: Japanese Patent Laid-open Publication No. 5-60871
Patent Document 2: Japanese Patent Laid-open Publication No. 5-188148
Patent Document 3: Japanese Patent Laid-open Publication No. 2011-188148
Patent Document 4: Japanese Patent Laid-open Publication No. 2011-007552

SUMMARY OF THE INVENTION

The present invention aims to solve the above-described disadvantages and provide a scintillator panel which is provided with a narrow barrier rib with high accuracy in a large area, has high luminous efficiency, and provides sharp images.

The above-described object is achieved by any of the following technical means.

(1) A scintillator panel including: a plate-like substrate; a grid-like barrier rib provided on the substrate; and a scintillator layer composed of a phosphor filled in cells divided by the barrier rib, wherein the barrier rib is formed of a material which is mainly composed of a low-melting-point glass containing 2 to 20% by mass of an alkali metal oxide.

(2) A method for manufacturing a barrier rib member having a plate-like substrate, and a grid-like barrier rib provided on the substrate, the method including:
a step of forming a photosensitive paste coating film by applying onto a substrate a photosensitive paste which contains a low-melting-point glass powder containing 2 to 20% by mass of an alkali metal oxide, and a photosensitive organic component;
a step of exposing the obtained photosensitive paste coating film to light through a photomask having a predetermined opening;
a development step of dissolving and removing a part of the exposed photosensitive paste coating film which is soluble in a developer to obtain a photosensitive paste coating film pattern; and
a firing step of heating the photosensitive paste coating film pattern after development to 500° C. to 700° C. to remove the organic component and soften and sinter the low-melting-point glass and thereby forming a barrier rib.

(3) A method for manufacturing a scintillator panel including a plate-like substrate, a grid-like barrier rib provided on the substrate, and a scintillator layer composed of a phosphor filled in cells divided by the barrier rib, the method including:
a step of forming a photosensitive paste coating film by applying onto a substrate a photosensitive paste which contains a low-melting-point glass powder containing 2 to 20% by mass of an alkali metal oxide, and a photosensitive organic component;
a step of exposing the obtained photosensitive paste coating film to light through a photomask having a predetermined opening;

a development step of dissolving and removing a part of the exposed photosensitive paste coating film which is soluble in a developer to obtain a photosensitive paste coating film pattern;

a firing step of heating the photosensitive paste coating film pattern after development to 500° C. to 700° C. to remove the organic component and soften and sinter the low-melting-point glass and thereby forming a barrier rib; and a step of filling a phosphor in cells divided by the barrier rib.

(4) A method for manufacturing a scintillator panel including a plate-like substrate, a buffer layer provided on the substrate, a grid-like barrier rib provided on the buffer layer, and a scintillator layer composed of a phosphor filled in cells divided by the barrier rib, the method including:

a step of forming a buffer layer paste coating film by applying onto a substrate a buffer layer paste which contains an inorganic powder selected from a low-melting-point glass powder and a ceramic powder, and a photosensitive organic component;

a step of exposing the entire surface of the buffer layer paste coating film to light;

a step of forming a barrier rib photosensitive paste coating film by applying onto the exposed buffer layer paste coating film a barrier rib photosensitive paste which contains a low-melting-point glass powder containing 2 to 20% by mass of an alkali metal oxide, and a photosensitive organic component;

a step of exposing the obtained barrier rib photosensitive paste coating film to light through a photomask having a predetermined opening;

a development step of dissolving and removing a part of the exposed photosensitive paste coating film which is soluble in a developer to obtain a photosensitive paste coating film pattern;

a firing step of heating the buffer layer paste coating film and the photosensitive paste coating film pattern after development to 500° C. to 700° C. to remove the organic component and soften and sinter the low-melting-point glass and thereby forming a buffer layer and a barrier rib at the same time; and a step of filling a phosphor in cells divided by the barrier rib.

According to the present invention, a barrier rib can be formed with high accuracy in a large area, so that there can be provided a scintillator panel which has a large size and allows sharp images to be photographed, and a method for manufacturing the scintillator panel.

DETAILED DESCRIPTION OF EMBODIMENTS OF THE INVENTION

The preferred configurations of a scintillator panel of the present invention and a radiation detector using the scintillator panel will be described below with reference to the drawings, but the present invention is not limited thereto.

Figure 1:
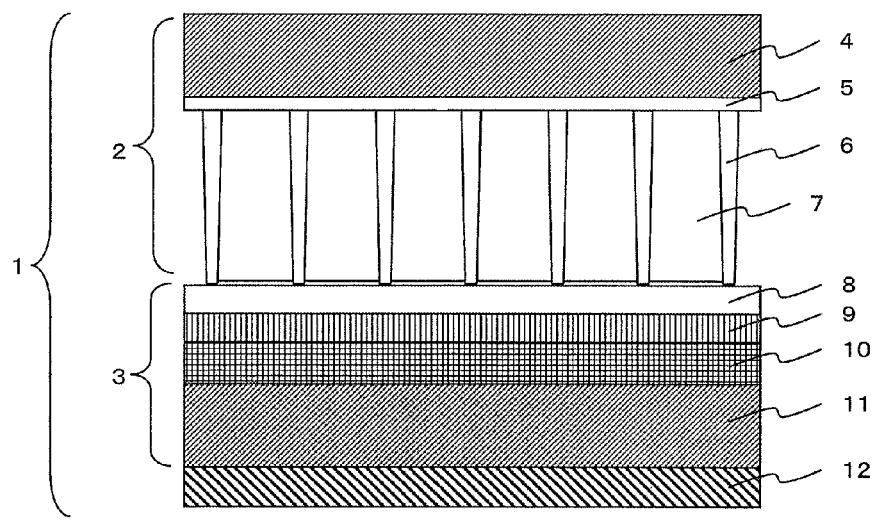
FIG. 1 is a sectional view schematically showing the configuration of a radiation detector including a scintillator panel according to an embodiment of the present invention.
Figure 2:
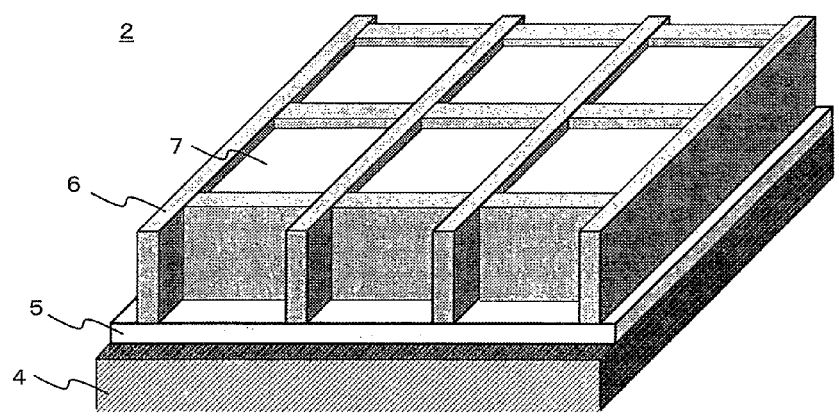
FIG. 2 is a perspective view schematically showing the configuration of the scintillator panel according to an embodiment of the present invention.

FIG. 1 is a sectional view schematically showing the configuration of a radiation detector including a scintillator panel according to an embodiment of the present invention. FIG. 2 is a perspective view schematically showing the configuration of the scintillator panel according to an embodiment of the present invention. A radiation detector 1 includes a scintillator panel 2, an output substrate 3 and a power supply portion 12. The scintillator panel 2 includes a scintillator layer 7 composed of a phosphor, and absorbs energy of an incident radiation such as an X ray to emit an electromagnetic wave having a wavelength ranging from 300 nm to 800 nm, i.e. an electromagnetic wave (light) which ranges from ultraviolet light to infrared light with visible light at the center.

The scintillator panel 2 includes a substrate 4, a grid-like barrier rib 6 formed on the substrate and intended for dividing cells, and a scintillator layer 7 composed of a phosphor filled in a space formed by the barrier rib. By further forming a buffer layer 5 between the substrate 1 and the barrier rib 6, the barrier rib 6 can be stably formed. By increasing the reflectivity of the buffer layer 5 to visible light, light emitted at the scintillator layer 7 can be made to reach a photoelectric conversion layer 9 on the output substrate 3 efficiently.

The output substrate 3 has on a substrate 11 the photoelectric conversion layer 9 in which pixels composed of photosensors and TFT are two-dimensionally formed, and an output layer 10. When the light exit surface of the scintillator panel 2 and the photoelectric conversion layer 9 of the output substrate 3 are bonded or adhered to each other with a diaphragm layer 8, which is composed of a polyimide resin or the like, interposed therebetween, the radiation detector 1 is formed. Light emitted at the scintillator layer 7 reaches the photoelectric conversion layer 9, undergoes photoelectric conversion at the photoelectric conversion layer 9, and exits. In the scintillator panel of the present invention, each cell is preferably divided by a barrier rib, and therefore when the size and pitch of pixels of a photoelectric conversion element arranged in a grid-like shape are made coincident with the size and pitch of cells of the scintillator panel, scattered light can be prevented from reaching a neighboring cell even though light is scattered by a phosphor. In this way, blurring of images resulting from light scattering can be reduced, so that high-accuracy photographing is possible.

As the substrate to be used for the scintillator panel of the present invention, various kinds of glasses, polymer materials, metals and the like can be used as long as they are pervious to radiations. For example, a glass plate composed of a glass such as quartz, borosilicate glass or chemically reinforced glass; a ceramic substrate composed of a ceramic such as sapphire, silicon nitride, silicon carbide; a semiconductor substrate composed of a semiconductor such as silicon, germanium, gallium arsenide, gallium phosphide or gallium nitrogen; a polymer film (plastic film) such a cellulose acetate film, a polyester film, a polyethylene terephthalate film, a polyamide film, a polyimide film, a triacetate film, a polycarbonate film or a carbon fiber reinforced resin sheet; a metal sheet such an aluminum sheet, an iron sheet or a copper sheet; a metal sheet having a coating layer of a metal oxide, or an amorphous carbon substrate; or the like can be used. Particularly, a glass plate is desirable in terms of flatness and heat resistance. Further, since weight reduction of the scintillator panel is promoted for convenience of transportation of the scintillator panel, the glass plate has a thickness of preferably 2.0 mm or less, further preferably 1.0 mm or less.

A barrier rib is formed on the substrate, and it is preferable that the barrier rib is formed of a glass material in terms of durability and heat resistance. In the scintillator panel of the present invention, the barrier rib is preferably formed of a material which is mainly composed of a low-melting-point glass containing 2 to 20% by mass of an alkali metal oxide.

The material which is mainly composed of a low-melting-point glass containing 2 to 20% by mass of an alkali metal oxide has a proper refractive index and a softening temperature, and is suitable for forming a narrow barrier rib with high accuracy in a large area. In the present invention, the low-melting-point glass refers to a glass having a softening temperature of 700° C. or lower. The phrase "mainly composed of a low-melting-point glass" means that a low-melting-point glass powder constitutes 50% by mass to 100% by mass of a material that forms the barrier rib.

A method for manufacturing a scintillator panel according to an embodiment of the present invention includes a step of forming a photosensitive paste coating film by applying onto a substrate a photosensitive paste which contains a low-melting-point glass powder containing 2 to 20% by mass of an alkali metal oxide, and a photosensitive organic component; an exposure step of exposing the obtained photosensitive paste coating film to light through a photomask having a predetermined opening; a development step of dissolving and removing a part of the exposed photosensitive paste coating film which is soluble in a developer to obtain a photosensitive paste coating film pattern; and a firing step of heating the photosensitive paste coating film pattern after development to a high temperature to remove the organic component and soften and sinter the low-melting-point glass and thereby forming a barrier rib. In the exposure step, a necessary part of the photosensitive paste coating film is photocured, or an unnecessary part of the photosensitive paste coating film is photodecomposed by exposure to add a contrast of dissolution of the photosensitive paste coating film in a developer. In the development step, an unnecessary part of the exposed photosensitive paste coating film is removed with a developer, so that a photosensitive paste coating film pattern in which only a necessary part of the coating film remains is obtained.

In the firing step, the obtained photosensitive paste coating film pattern is fired at a temperature of preferably 500 to 700° C., more preferably 500 to 650° C., whereby the organic component is decomposed and distilled away, and the low-melting-point glass powder is softened and sintered to form a barrier rib containing a low-melting-point glass. For completely removing the organic component, the firing temperature is preferably 500° C. or higher. If the firing temperature is higher than 700° C., deformation of the substrate increases when a general glass substrate is used as the substrate, and therefore the firing temperature is preferably 700° C. or lower.

The method of the present invention is capable of processing with high accuracy as compared to a processing method in which a glass paste is printed by laminating by a multi-layer screen printing and then fired.

The photosensitive paste for use in the present invention is preferably formed of an organic component containing a photosensitive organic component, and an inorganic powder containing a low-melting-point glass powder containing 2 to 20% by mass of an alkali metal oxide. The organic component is required in a definite amount for forming a photosensitive paste coating film pattern before firing, but if the amount of the organic component is excessively large, the amount of substances removed in the firing step increases, so that the shrinkage rate after firing becomes large, and therefore pattern defects easily occurs in the firing step. On the other hand, an excessively small amount of the organic component may not be preferable because miscibility and dispersibility of inorganic fine particles in the paste are deteriorated, so that not only defects easily occur during firing, but also coatability of the paste is deteriorated due to an increase in viscosity of the paste, and further the stability of the paste is adversely affected. Thus, the content of the inorganic powder in the photosensitive paste is preferably 30% by mass to 80% by mass, more preferably 40% by mass to 70% by mass. The content of the low-melting-point glass powder is preferably 50% by mass to 100% by mass based on the total of the inorganic powder. The content of the low-melting-point glass powder being less than 50% by mass with respect to the inorganic powder is not preferable because sintering does not properly proceed in the firing step, and therefore the strength of the barrier rib obtained decreases.

For ensuring that in the firing step, the organic component is almost completely removed and the barrier rib obtained has a definite strength, it is preferable to use a low-melting-point glass powder composed of a low-melting-point glass having a softening temperature of 480° C. or higher. If the softening temperature is lower than 480° C., the low-melting-point glass is softened before the organic component is sufficiently removed during firing, so that residues of the organic component are captured in the glass. In this case, the organic component may be gradually released later to deteriorate product quality. Further, residues of the organic component captured in the glass become a cause of coloring of the glass. When a low-melting-point glass powder having a softening temperature of 480° C. or higher is used and firing is performed at a temperature of 500° C. or higher, the organic component can be completely removed. Since the firing temperature in the firing step is preferably 500 to 700° C., more preferably 500 to 650° C. as described above, the softening temperature of the low-melting-point glass is preferably 480 to 700° C., more preferably 480 to 640° C., further preferably 480 to 620° C.

The softening temperature is determined by extrapolating a heat absorption completion temperature at an endothermic peak by a tangent method from a DTA curve obtained by measuring a sample using a differential thermal analyzer (DTA, "Differential Type Differential Thermal Balance TG8120" manufactured by Rigaku Corporation). Specifically, an inorganic powder as a measurement sample is measured by elevating the temperature at 20° C./minute from room temperature with an alumina powder as a standard sample using a differential thermal analyzer, thereby obtaining a DTA curve. A softening point Ts determined by extrapolating a heat absorption completion temperature at an endothermic peak by a tangent method from the obtained DTA curve is defined as a softening temperature.

The thermal expansion coefficient of the low-melting-point glass is preferably 40 to $90 \times 10^{-7}$ (/K), further preferably 40 to $65 \times 10^{-7}$. If the thermal expansion coefficient is more than $90 \times 10^{-7}$ when a photosensitive paste coating film containing a low-melting-point glass is formed on a substrate and fired, the panel is significantly warped, and therefore construction as a radiation detector is difficult. In a radiation detector with warpage occurring in a panel, it is difficult to detect high-definition images because crosstalk of emitted light occurs in the panel plane, or variations occur in detection sensitivity of an amount of emitted light. If the thermal expansion coefficient is less than $40 \times 10^{-7}$, the softening temperature of the low-melting-point glass cannot be sufficiently lowered.

For obtaining a low-melting-point glass, a metal oxide selected from lead oxide, bismuth oxide, zinc oxide and alkali metal oxides, which are materials effective for lowering the melting point of glass, can be used. Particularly, it is desirable to adjust the softening temperature of glass using an alkali metal oxide. Generally the alkali metal refers to lithium, sodium, potassium, rubidium and cesium, but the alkali metal oxide for use in the present invention refers to a metal oxide selected from lithium oxide, sodium oxide and potassium oxide.

In the present invention, it is preferred that the content X of an alkali metal oxide ($M_2O$) in the low-melting-point glass be in a range of 2 to 20% by mass. If the content of the alkali metal oxide is less than 2% by mass, the softening temperature becomes high, and therefore it is necessary to perform the firing step at a high temperature. Accordingly, when a glass substrate is used as the substrate, it is likely that the scintillator panel obtained is distorted or defects occur in the barrier rib due to deformation of the substrate in the firing step, and therefore the content of less than 2% by mass is not suitable. If the content of the alkali metal oxide is more than 20% by mass, the viscosity of glass decreases too much in the firing step. Accordingly, the shape of the barrier rib obtained is easily distorted. Further, the porosity of the barrier rib obtained becomes excessively small, leading to a decrease in light emission luminance of the scintillator panel obtained.

Further, it is desirable to add 3 to 10% by mass of zinc oxide in addition to the alkali metal oxide for adjusting the viscosity of glass at a high temperature. If the content of zinc oxide is 3% by mass or less, the viscosity of glass at a high temperature becomes high, and addition of 10% by mass or more tends to increase the cost of glass.

Further, by including, in addition to the alkali metal oxide and zinc oxide, silicon oxide, boron oxide, aluminum oxide, an oxide of an alkali earth metal or the like in the low-melting-point glass, the stability, crystallinity, transparency, refractive index, thermal expansion characteristic and the like of the low-melting-point glass can be controlled. As a composition of the low-melting-point glass, the composition range shown below is preferable because a low-melting-point glass having a viscosity characteristic suitable for the present invention can be prepared.

Alkali metal oxide: 2 to 20% by mass
Zinc oxide: 3 to 10% by mass
Silicon oxide: 20 to 40% by mass
Boron oxide: 25 to 40% by mass
Aluminum oxide: 10 to 30% by mass
Alkali earth metal oxide: 5 to 15% by mass The alkali earth metal refers to one or more metal selected from magnesium, calcium, barium and strontium.

The particle diameter of inorganic particles containing a low-melting-point glass powder was evaluated using a particle size distribution measuring device ("MT 3300" manufactured by NIKKISO CO., LTD.). As a measurement method, an inorganic powder was charged in a sample chamber filled with water, and subjected to an ultrasonic treatment for 300 seconds, followed by performing a measurement.

It is desirable that the 50% volume average particle diameter (D50) be in a range of 1.0 to 4.0 μm as a particle diameter of the low-melting-point glass powder. If D50 is less than 1.0 μm, agglomeration of particles becomes strong, so that it becomes difficult to achieve uniform dispersibility, leading to unstable fluidity of a paste. In this case, thickness uniformity when a paste is applied is deteriorated. If D50 is more than 4.0 μm, the surface unevenness of a sintered body obtained increases, so that a pattern tends to be broken in a subsequent step.

The photosensitive paste for use in the present invention may contain as a filler a high-melting-point glass that is not softened at 700° C., or ceramic particles such as those of silicon oxide, aluminum oxide, titanium oxide or zirconium oxide in addition to the above-described low-melting-point glass powder. The filler, when used together with the low-melting-point glass powder, has an effect of controlling the shrinkage rate after firing of a paste composition and retaining the shape of the barrier rib formed. However, if the ratio of the filler to the total of the inorganic powder is more than 50% by mass, sintering of the low-melting-point glass powder is hindered to cause a problem such as a reduction in strength of the barrier rib, and therefore the ratio of more than 50% by mass is not preferable. Preferably the filler has an average particle diameter of 0.5 to 4.0 μm for the same reason as that described for the low-melting-point glass powder.

In the photosensitive paste composition for use in the present invention, the average refractive index n1 of the low-melting-point glass powder and the average refractive index n2 of the photosensitive organic component satisfies preferably $-0.1 < n1-n2 < 0.1$, more preferably $-0.01 \leq n1-n2 \leq 0.01$, further preferably $-0.005 \leq n1-n2 \leq 0.005$. By satisfying the above-described requirement, light scattering at the interface between the low-melting-point glass powder and the photosensitive organic component is suppressed in the exposure step, so that pattern formation can be performed with high accuracy. By adjusting the compounding ratio of oxides that form the low-melting-point glass powder, a low-melting-point glass powder having both a preferable heat characteristic and a preferable average refractive index can be obtained.

The refractive index of the low-melting-point glass powder can be measured using a Becke line detection method. A refractive index at 25° C. and at a wavelength of 436 nm (g-ray) was defined as the refractive index of the low-melting-point glass powder in the present invention. The average refractive index of the photosensitive organic component can be determined by measuring a coating film composed of a photosensitive organic component by ellipsometry. A refractive index at 25° C. and at a wavelength of 436 nm (g-ray) was defined as the average refractive index of the photosensitive organic component.

When the photosensitive paste for use in the present invention includes a photosensitive organic component as an organic component, it can be pattern-processed by the photosensitive paste method described above. By using a photosensitive monomer, a photosensitive oligomer, a photosensitive polymer, a photo-polymerization initiator or the like as the photosensitive organic component, reactivity can be controlled. Here, the photosensitivity in the photosensitive monomer, the photosensitive oligomer and the photosensitive polymer means that when the paste is irradiated with active light rays, the photosensitive monomer, the photosensitive oligomer or the photosensitive polymer undergoes a reaction of photo-crosslinking, photopolymerization or the like to change the chemical structure.

The photosensitive monomer is a compound having an active carbon-carbon double bond, and examples thereof include monofunctional compounds and polyfunctional compounds having a vinyl group, an acryloyl group, a methacryloyl group or an acrylamide group as a functional group. Particularly, a photosensitive paste including in an organic component 10 to 80% by mass of a compound selected from polyfunctional acrylate compounds and polyfunctional methacrylate compounds is preferable in that the crosslinking density during curing is increased by a photoreaction to improve pattern formability. As the polyfunctional acrylate compounds and polyfunctional methacrylate compounds, a variety of kinds of compounds have been developed, and an appropriate one can be selected from those compounds in consideration of reactivity, a refractive index and the like.

As the photosensitive oligomer and the photosensitive polymer, oligomers and polymers having an active carbon-carbon double bond are preferably used. The photosensitive oligomer and the photosensitive polymer are obtained by, for example, copolymerizing a carboxyl group-containing monomer such as acrylic acid, methacrylic acid, itaconic acid, crotonic acid, maleic acid, fumaric acid, vinylacetic acid or an acid anhydride thereof, and a monomer such as a methacrylic acid ester, an acrylic acid ester, styrene, acrylonitrile, vinyl acetate or 2-hydroxy acrylate. As a method for introducing an active carbon-carbon unsaturated double bond into an oligomer or a polymer, a method can be used in which an ethylenically unsaturated compound having a glycidyl group or an isocyanate group, acrylic acid chloride, methacrylic acid chloride or acryl chloride, or a carboxylic acid such as maleic acid is reacted with a mercapto group, an amino group, a hydroxyl group or a carboxyl group in an oligomer or a polymer, etc.

By using as the photosensitive monomer or the photosensitive oligomer a monomer or oligomer having a urethane structure, a photosensitive paste insusceptible to pattern defects in the firing step can be obtained. In the present invention, pattern defects are suppressed because rapid shrinkage is hard to occur in the process of sintering of a glass powder in the later stage of the firing step due to use of a low-melting-point glass powder as the glass powder. In addition, when a compound having a urethane structure is used for the organic component, stress is relaxed in the process of decomposition and distillation of the organic component in the early stage of the firing step, so that pattern defects are hard to occur. Owing to both the effects described above, pattern defects can be suppressed over a wide temperature range.

The photo-polymerization initiator is a compound which generates radicals when irradiated with an active light source. Specific examples thereof include benzophenone, methyl ortho-benzoylbenzoate, 4,4-bis(dimethylamino)benzophenone, 4,4-bis(diethylamino)benzophenone, 4,4-dichlorobenzophenone, 4-benzoyl-4-methyl diphenyl ketone, dibenzyl ketone, fluorenone, 2,2-dimethoxy-2-phenylacetophenone, 2-hydroxy-2-methylpropiophenone, thioxanthone, 2-methylthioxanthone, 2-chlorothioxanthone, 2-isopropylthioxanthone, diethylthioxanthone, benzyl, benzyl methoxyethyl acetal, benzoin, benzoin methyl ether, benzoin butyl ether, anthraquinone, 2-t-butylanthraquinone, anthrone, benzanthrone, dibenzosuberone, methylene anthrone, 4-azidobenzalacetophenone, 2,6-bis(p-azidobenzylidene)cyclohexanone, 2,6-bis(p-azidobenzylidene)-4-methylcyclohexanone, 1-phenyl-1,2-butadione-2-(O-methoxycarbonyl)oxime, 1-phenyl-1,2-propanedione-2-(O-ethoxycarbonyl)oxime, 1,3-diphenylpropanetrione-2-(O-ethoxycarbonyl)oxime, 1-phenyl-3-ethoxypropanetrione-2-(O-benzoyl)oxime, Michler ketone, 2-methyl-1-[4-(methylthio)phenyl]-2-morphorino-1-propanone, 2-benzyl-2-dimethylamino-1-(4-morpholinophenyl)butanone-1, naphthalenesulfonyl chloride, quinolinesulfonyl chloride, N-phenylthioacridone, benzothiazole disulfide, triphenylphosphine, benzoin peroxide and eosine, and combinations of a photo-reductive pigments such as methylene blue and reducing agents such as ascorbic acid and triethanolamine. These compounds may be used in combination of two or more thereof.

The photosensitive paste may contain as a binder a copolymerized polymer having a carboxyl group. The copolymer having a carboxyl group is obtained by, for example, selecting a carboxyl group-containing monomer such as acrylic acid, methacrylic acid, itaconic acid, crotonic acid, maleic acid, fumaric acid, vinylacetic acid or an acid anhydride thereof and other monomers such as such as a methacrylic acid ester, an acrylic acid ester, styrene, acrylonitrile, vinyl acetate or 2-hydroxy acrylate, and copolymerizing the monomers using an initiator such as azobisisobutyronitrile. As the copolymer having a carboxyl group, a copolymer having an acrylic acid ester or a methacrylic acid ester and an acrylic acid or a methacrylic acid as copolymerization components is preferably used because the thermal decomposition temperature during firing is low.

The photosensitive paste is a paste excellent in solubility in an alkali aqueous solution when it contains a copolymerized polymer having a carboxyl group. The acid value of the copolymer having a carboxyl group is preferably 50 to 150 mg KOH/g. When the acid value is 150 mg KOH/g or less, the allowable range of development can be widened. When the acid value is 50 mg KOH/g or more, solubility of an unexposed part in a developer is not reduced. Therefore, it is not necessary to increase the concentration of a developer, and peeling of an exposed part is prevented, so that a high-definition pattern can be obtained. Further, it is also preferable that the copolymer having a carboxyl group has an ethylenically unsaturated group on a side chain. Examples of the ethylenically unsaturated group include an acryl group, a methacryl group, a vinyl group and an allyl group.

The photosensitive paste is prepared by adding an organic solvent and a binder as required to a low-melting-point glass powder and a photosensitive organic component composed of a photosensitive monomer, a photosensitive oligomer, a photosensitive polymer, a photo-polymerization initiator or the like, and compounding various components so as to achieve a predetermined composition, followed by uniformly mixing and dispersing the mixture using a three-roll roller or a kneader.

The viscosity of the photosensitive paste can be appropriately adjusted by the added ratios of an inorganic powder, a thickener, an organic solvent, a polymerization inhibitor, a plasticizer, a precipitation preventive agent and so on, and is preferably in a range of 2 to 200 Pa·s. For example, when the photosensitive paste is applied to the substrate by a spin coating method, a viscosity of 2 to 5 Pa·s is preferable. When the photosensitive paste is applied to the substrate by a screen printing method to achieve a film thickness of 10 to 40 μm in one application, a viscosity of 50 to 200 Pa·s is preferable. When a blade coater method, a die coater method or the like is used, a viscosity of 10 to 50 Pa·s is preferable.

By applying the photosensitive paste thus obtained onto the substrate, forming a desired pattern by a photolithography method and performing firing, a barrier rib can be formed. An example of manufacturing a barrier rib by the photolithography method using the above-described photosensitive paste will be described, but the present invention is not limited thereto.

The photosensitive paste is applied onto the whole or part of the surface of the substrate to form a photosensitive paste coating film. As an application method, a screen printing method, or a method using a bar coater, a roll coater, a die coater or a blade coater, or the like can be used. The coating thickness can be adjusted by selecting the number of applications, a mesh of the screen, and a viscosity of the paste.

Subsequently, an exposure step is performed. Generally exposure is performed through a photomask as in usual photolithography. Alternatively, a method of directly making a drawing by laser light, etc. without using a photomask may be used. As an exposure device, a proximity exposure machine or the like can be used. When exposure of a large area is performed, a large area can be exposed with an exposure machine having a small exposure area by performing exposure while carrying out conveyance after applying the photosensitive paste onto the substrate. Examples of the active light ray used at this time include a near infrared ray, a visible light ray and an ultraviolet ray. Among them, the ultraviolet ray is most preferable, and as a light source thereof, for example, a low-pressure mercury lamp, a high-pressure mercury lamp, an ultra-high pressure mercury lamp, a halogen lamp, a germicidal lamp or the like can be used. Among them, the ultra-high pressure mercury lamp is preferred. Exposure conditions vary depending on the coating thickness, and usually exposure is performed for 0.01 to 30 minutes using an ultra-high pressure mercury lamp with a power of 1 to 100 mW/cm$^2$.

After exposure, development is performed using a difference in solubility in a developer between an exposed part and an unexposed part of the photosensitive paste coating film, thereby obtaining a desired grid-shaped photosensitive paste coating film pattern. Development is performed using a dipping method, a spray method or a brush method. For the developer, a solvent capable of dissolving the organic component in the paste can be used. Preferably the developer is mainly composed of water. When a compound having an acidic group such as a carboxyl group exists in the paste, development can be performed with an alkali aqueous solution. As the alkali aqueous solution, an inorganic alkali aqueous solution such as that of sodium hydroxide, sodium carbonate or calcium hydroxide can be used, but use of an organic alkali aqueous solution is more preferable because an alkali component is easily removed during firing. Specific examples of the organic alkali include tetramethylammonium hydroxide, trimethylbenzylammonium hydroxide, monoethanolamine and diethanolamine. The concentration of the alkali aqueous solution is preferably 0.05 to 5% by mass, more preferably 0.1 to 1% by mass. If the alkali concentration is excessively low, a soluble part may not be removed, and if the alkali concentration is excessively high, a pattern part may be peeled to corrode a non-soluble part. The development temperature during development is preferably 20 to 50° C. in terms of process control.

Next, a firing step is performed in a firing furnace. The atmosphere and temperature for the firing step vary depending on the types of the photosensitive paste and the substrate, but firing is performed in air or in an atmosphere of nitrogen, hydrogen or the like. As the firing furnace, a batch-type firing furnace or a belt-type continuous firing furnace can be used. Preferably firing is performed while the temperature is kept at normally 500 to 700° C. for 10 to 60 minutes. The firing temperature is more preferably 500 to 650° C. By the step described above, the organic component is removed from the grid-shaped photosensitive paste coating film pattern, and the low-melting-point glass contained in the coating film pattern is softened and sintered to obtain a barrier rib member in which a grid-like barrier rib substantially composed of an inorganic substance is formed on a substrate.

The height (H) of the barrier rib is preferably 100 to 1000 μm, more preferably 160 to 500 μm further preferably 250 to 500 μm. If the height of the barrier rib is more than 1000 μm, pattern formation during processing is difficult. On the other hand, if the height of the barrier rib is low, the amount of a phosphor capable of being filled decreases, and therefore the light emission luminance of a scintillator panel obtained decreases, so that it is difficult to photograph sharp images.

The pattern shape of the barrier rib is not particularly limited, but is preferably a grid-like shape or a stripe-like shape. When a grid-like pattern is formed, the pitch (P) of the barrier rib is preferably 60 μm to 1000 μm. If the pitch is less than 60 μm, pattern formation during processing is difficult. If the pitch is excessively large, it is difficult to perform image photographing with high accuracy using a scintillator panel obtained.

Preferably, the bottom width (Lb) of the barrier rib is 20 μm to 150 μm and the top width (Lt) of the barrier rib is 15 μm to 80 μm. If the bottom width of the barrier rib is less than 20 μm, defects easily occur in the barrier rib during firing. On the other hand, if the bottom width of the barrier rib is large, the amount of a phosphor that can be filled in spaces divided by the barrier rib decreases. If the top width of the barrier rib is less than 15 μm, the strength of the barrier rib decreases. On the other hand, if the top width of the barrier rib is more than 80 μm, a region in the scintillator layer, which is available for extraction of emitted light, is narrowed. The aspect ratio (H/Lb) of the barrier rib height (H) to the barrier rib bottom width (Lb) is preferably 1.0 to 25.0. A barrier rib having a higher aspect ratio (H/Lb) to the barrier rib bottom width provides a larger space per one pixel divided by the barrier rib, so that a larger amount of a phosphor can be filled.

The aspect ratio (H/P) of the barrier rib height (H) to the barrier rib pitch (P) is preferably 0.1 to 3.5. A barrier rib having a higher aspect ratio (H/P) to the barrier rib pitch ensures that one pixel is divided with higher definition and a larger amount of a phosphor can be filled in a space per one pixel.

As a shape of the cell divided by the grid-like barrier rib, a shape such as square, rectangle, parallelogram or trapezoid can be appropriately selected. In the scintillator panel of the present invention, a grid-like barrier rib with which the shape of the cell is square is preferable in terms of uniformity of the barrier rib bottom width and uniformity of the phosphor light emission intensity in one pixel, but the shape of barrier rib is not limited thereto.

The height and width of the barrier rib were measured by exposing a barrier rib cross section perpendicular to the substrate and observing the cross section with a scanning electron microscope (manufactured by Hitachi, Ltd., S2400). The width of the barrier rib at a contact part between the barrier rib and the substrate was measured as the bottom width (Lb). When a buffer layer existed between the barrier rib and the substrate, the width of the barrier rib at a contact part between the barrier rib and the buffer layer was measured as the bottom width (Lb). The width at the topmost part of the barrier rib was measured as the top width (Lt).

The barrier rib is formed by sintering an inorganic powder contained in a photosensitive paste. Inorganic powders that form the barrier rib are fused together, but a pore part exists between the powders. The ratio of the pores included in the barrier rib can be adjusted by the thermal design in the firing step of firing the barrier rib. It is preferable that the ratio of the pore part to the whole barrier rib (porosity) is 2 to 25% because a barrier rib having both a proper reflection characteristic to visible light and a proper strength can be formed. If the porosity is less than 2%, the reflectivity of the barrier rib is low, and therefore the light emission luminance of a scintillator panel obtained decreases. If the porosity is more than 25%, the barrier rib has an insufficient strength, and is therefore easily collapsed. For achieving both a proper reflection characteristic and a proper strength, the porosity is more preferably 5 to 25%, further preferably 5 to 20%.

A method for measuring the porosity includes precisely polishing a cross section of a barrier rib, then observing the cross section with an electron microscope, converting an inorganic material part and a pore part into images in a two-gray scale, and calculating a ratio of the area of the pore part to the area of the barrier rib cross section.

Preferably a buffer layer, composed of an inorganic component selected from a low-melting-point glass and a ceramic is provided between the barrier rib and the substrate. The buffer layer has an effect of relaxing stress on the barrier rib to achieve stable barrier rib formation in the firing step. It is preferable that the buffer layer has a high reflectivity because the light emission luminance of the scintillator panel can be enhanced by reflecting visible light emitted by a phosphor toward a photoelectric conversion element. For enhancing the reflectivity, it is preferable that the buffer layer is composed of a low-melting-point glass and a ceramic. As the low-melting-point glass, one similar to that for the barrier rib can be used. The ceramic is preferably titanium oxide, aluminum oxide, zirconium oxide or the like.

For forming the buffer layer, a paste formed by dispersing an organic component and an inorganic powder such as a low-melting-point glass powder or a ceramic powder in a solvent is applied to abase and dried to form a buffer layer paste coating film. Next, the buffer layer paste coating film is fired at a temperature of preferably 500 to 700° C., more preferably 500 to 650° C., whereby a buffer layer can be formed.

It is also possible to complete firing of the buffer layer and firing of the barrier rib simultaneously. By using the simultaneous firing, the number of firing steps can be reduced, so that energy consumed in the firing step can be reduced. When simultaneous firing of the buffer layer and the barrier rib is used, it is preferable that using a photosensitive organic component similar to the aforementioned barrier rib photosensitive paste as an organic component of a buffer layer paste, a buffer layer paste coating film is formed, followed by exposing the whole surface of the buffer layer paste coating film to light to cure the coating film. It is also preferable that using as an organic component of a buffer layer paste a thermosetting organic component containing a polymerizable compound selected from polymerizable monomers, polymerizable oligomers and polymerizable polymers, and a thermal polymerization initiator, a buffer layer paste coating film is formed, followed by performing heat curing. According to these methods, the buffer layer paste coating film is made insoluble in a solvent, and therefore the buffer layer paste coating film can be prevented from being dissolved or peeled in a step of applying a barrier rib photosensitive paste onto the coating film.

To the thermosetting buffer layer paste can be appropriately added a binder such as ethyl cellulose, a dispersing agent, a thickener, a plasticizer, a precipitation preventive agent and the like in addition to the components described above.

The reflectivity of the buffer layer to light having a wavelength of 550 nm is preferably 60% or more. When the reflectivity of the buffer layer is 60% or more, emitted light of the panel is not transmitted through the buffer layer, and thus emitted light can be effectively extracted to the output substrate side.

Next, a phosphor is filled in cells divided by the barrier rib, whereby a scintillator panel can be completed. Here, the cell refers to a space divided by a grid-like barrier rib. The phosphor filled in the cell is referred to as a scintillator layer.

For the phosphor, various known phosphor materials can be used. Particularly, CsI is preferable because the conversion rate of an X ray to visible light is relatively high and the reflectivity of light by crystals of the phosphor is high. For enhancing luminous efficiency, various kinds of activators may be added to CsI. For example, a mixture of CsI and sodium iodide (NaI) in an arbitrary molar ratio, and CsI containing activation substances such as indium (In), thallium (Tl), lithium (Li), potassium (K), rubidium (Rb) and sodium (Na) are preferable. Further, a thallium compound such as thallium bromide (TlBr), thallium chloride (TlCl) or thallium fluoride (TlF, TlF$_3$) can be used as an activator.

For formation of a scintillator layer, for example, a method in which crystalline CsI is deposited by vacuum deposition (in this case, it is also possible to co-deposit a thallium compound such as thallium bromide); a method in which a slurry of a phosphor dispersed in water is applied to a substrate; or a method in which a phosphor paste prepared by mixing a phosphor powder, an organic binder such as ethyl cellulose or an acrylic resin, and an organic solvent such as terpineol or γ-butyrolactone is applied using screen printing or a dispenser, can be used.

For the amount of a phosphor filled in cells divided by the barrier rib, the volume fraction of the phosphor to the space volume in the cell (hereinafter, referred to as a phosphor volume filling ratio) is preferably 55% to 100%, more preferably 60% to 100%, further preferably 70% to 100%. If the phosphor volume fraction is less than 55%, incident X rays cannot be efficiently converted to visible light. For enhancing conversion efficiency of incident X rays, it is preferable to fill the phosphor in the space of the cell with a high density.

EXAMPLES

The present invention will be described in detail below by way of Examples. However, the present invention is not limited thereto.

(Raw Materials of Barrier Rib Photosensitive Paste)

Raw materials used for a photosensitive paste of examples are as follows.

Photosensitive monomer M-1: trimethylolpropane triacrylate
Photosensitive monomer M-2: tetrapropylene glycol dimethacrylate
Photosensitive monomer M-3: compound of the formula (A), wherein $R^1$ and $R^2$ are hydrogen, $R^3$ is an ethylene oxide-propylene oxide cooligomer, $R^4$ is an isophorone di-isocyanate residue, and the molecular weight is 19,000

$$R^1-(R^4-R^3)_n-R^4-R^2 \qquad (A)$$

Photosensitive polymer: product of addition reaction of 0.4 equivalents of glycidyl methacrylate to carboxyl groups of a copolymer composed of methacrylic acid/methyl methacrylate/styrene in a mass ratio of 40/40/30 (weight average molecular weight: 43000, acid value: 100)
Photo-polymerization initiator:
2-benzyl-2-dimethylamino-1-(4-morpholinophenyl)butanone-1 (IC$_{369}$ manufactured by BASF)
Polymerization inhibitor:
1,6-hexanediol-bis[(3,5-di-t-butyl-4-hydroxyphenyl)propionate])
Ultraviolet ray absorber solution: 0.3 mass % γ-butyrolactone solution of Sudan IV (manufactured by TOKYO OHKA KOGYO Co., Ltd.)
Binder polymer: ethyl cellulose (manufactured by Hercules Inc.)
Viscosity modifier: Flownon EC121 (manufactured by KYOEISHA CHEMICAL CO., LTD.)
Solvent A: γ-butyrolactone
Solvent B: terpineol
Low-melting-point glass powder A:
27% by mass of SiO$_2$, 31% by mass of B$_2$O$_3$, 6% by mass of ZnO, 7% by mass of Li$_2$O, 2% by mass of MgO, 2% by mass of CaO, 2% by mass of BaO, 23% by mass of Al$_2$O$_3$, refractive index (ng): 1.56, softening temperature: 588° C., thermal expansion coefficient: 68×10$^{-7}$, average particle diameter: 2.3 μm
Low-melting-point glass powder B:
28% by mass of SiO$_2$, 30% by mass of B$_2$O$_3$, 6% by mass of ZnO, 2% by mass of Li$_2$O, 3% by mass of MgO, 3% by mass of CaO, 3% by mass of BaO, 25% by mass of Al$_2$O$_3$, refractive index (ng): 1.551, softening temperature: 649° C., thermal expansion coefficient: 49×10$^{-7}$, average particle diameter: 2.1 μm Low-melting-point glass powder C:
28% by mass of SiO$_2$, 23% by mass of B$_2$O$_3$, 4% by mass of ZnO, 5% by mass of Li$_2$O, 15% by mass of K$_2$O, 4% by mass of MgO, 1% by mass of BaO, 20% by mass of Al$_2$O$_3$, refractive index (ng): 1.563, softening temperature: 540° C., thermal expansion coefficient: 86×10$^{-7}$, average particle diameter: 2.2 μm Low-melting-point glass powder D:
27% by mass of SiO$_2$, 33% by mass of B$_2$O$_3$, 4% by mass of ZnO, 4% by mass of Li$_2$O, 2% by mass of K$_2$O, 2% by mass of MgO, 3% by mass of CaO, 2% by mass of BaO, 23% by mass of Al$_2$O$_3$, refractive index (ng): 1.553, softening temperature: 613° C., thermal expansion coefficient: 55×10$^{-7}$, average particle diameter: 2.1 μm Low-melting-point glass powder E:
29% by mass of SiO$_2$, 32% by mass of B$_2$O$_3$, 4% by mass of ZnO, 6% by mass of Li$_2$O, 8% by mass of K$_2$O, 2% by mass of MgO, 2% by mass of CaO, 2% by mass of BaO, 15% by mass of Al$_2$O$_3$, refractive index (ng): 1.565, softening temperature: 570° C., thermal expansion coefficient: 70×10$^{-7}$, average particle diameter: 2.5 μm Low-melting-point glass powder F:
26% by mass of SiO$_2$, 32% by mass of B$_2$O$_3$, 2% by mass of ZnO, 2% by mass of Li$_2$O, 1% by mass of K$_2$O, 1% by mass of MgO, 2% by mass of CaO, 10% by mass of BaO, 24% by mass of Al$_2$O$_3$, refractive index (ng): 1.546, softening temperature: 655° C., thermal expansion coefficient: 45×10$^{-7}$, average particle diameter: 2.1 μm Glass powder G:
30% by mass of SiO$_2$, 34% by mass of B$_2$O$_3$, 4% by mass of ZnO, 1% by mass of Li$_2$O, 1% by mass of MgO, 2% by mass of CaO, 3% by mass of BaO, 26% by mass of Al$_2$O$_3$, refractive index (ng): 1.542, softening temperature: 721° C., thermal expansion coefficient: 38×10$^{-7}$, average particle diameter: 2.0 μm Low-melting-point glass powder H:
22% by mass of SiO$_2$, 30% by mass of B$_2$O$_3$, 1% by mass of ZnO, 8% by mass of Li$_2$O, 10% by mass of Na$_2$O, 6% by mass of K$_2$O, 4% by mass of MgO, 11% by mass of BaO, 8% by mass of Al$_2$O$_3$, refractive index (ng): 1.589, softening temperature: 520° C., thermal expansion coefficient: 89×10$^{-7}$, average particle diameter: 2.4 μm High-melting-point glass powder A:
30% by mass of SiO$_2$, 31% by mass of B$_2$O$_3$, 6% by mass of ZnO, 2% by mass of MgO, 2% by mass of CaO, 2% by mass of BaO, 27% by mass of Al$_2$O$_3$, refractive index (ng): 1.55, softening temperature: 790° C., thermal expansion coefficient: 32×10$^{-7}$, average particle diameter: 2.3 μm (Preparation of Barrier Rib Paste)

A barrier rib paste was prepared by the following method using the materials described above.

Barrier Rib Photosensitive Paste A: 4 parts by mass of the photosensitive monomer M-1, 6 parts by mass of the photosensitive monomer M-2, 24 parts by mass of the photosensitive polymer, 6 parts by mass of the photo-polymerization initiator, 0.2 parts by mass of the polymerization inhibitor and 12.8 parts by mass of the ultraviolet ray absorber solution were dissolved in 38 parts by mass of the solvent A under heating at a temperature of 80° C. After the obtained solution was cooled, 9 parts by mass of the viscosity modifier were added to prepare an organic solution 1. The refractive index (ng) of an organic coating film obtained by applying the organic solution 1 to a glass substrate and drying the applied solution was 1.555.

Next, to 60 parts by mass of the prepared organic solution 1 were added 30 parts by mass of the low-melting-point glass powder A and 10 parts by mass of the high-melting-point glass powder A, followed by kneading the mixture by a three-roll kneader to prepare a barrier rib photosensitive paste A.

Barrier Rib Photosensitive Paste B: An organic solution 1 was prepared in the same manner as in preparation of the barrier rib photosensitive paste A. Next, to 60 parts by mass of the prepared organic solution 1 were added 30 parts by mass of the low-melting-point glass powder B and 10 parts by mass of the high-melting-point glass powder A, followed by kneading the mixture by a three-roll kneader to prepare a barrier rib photosensitive paste B.

Barrier Rib Photosensitive Paste C: 5 parts by mass of the photosensitive monomer M-1, 5 parts by mass of the photosensitive monomer M-3, 24 parts by mass of the photosensitive polymer, 6 parts by mass of the photo-polymerization initiator, 0.2 parts by mass of the polymerization inhibitor and 12.8 parts by mass of the ultraviolet ray absorber solution were dissolved in 38 parts by mass of the solvent A under heating at a temperature of 80° C. After the obtained solution was cooled, 9 parts by mass of the viscosity modifier were added to prepare an organic solution 2. The refractive index (ng) of an organic coating film obtained by applying the organic solution 2 to a glass substrate and drying the applied solution was 1.559.

Next, to 60 parts by mass of the prepared organic solution 2 were added 30 parts by mass of the low-melting-point glass powder C and 10 parts by mass of the high-melting-point glass powder A, followed by kneading the mixture by a three-roll kneader to prepare a barrier rib photosensitive paste C.

Barrier Rib Photosensitive Paste D: An organic solution 1 was prepared in the same manner as in preparation of the barrier rib photosensitive paste A. Next, to 60 parts by mass of the prepared organic solution 1 were added 40 parts by mass of the low-melting-point glass powder A, followed by kneading the mixture by a three-roll kneader to prepare a barrier rib photosensitive paste D.

Barrier Rib Photosensitive Paste E: An organic solution 1 was prepared in the same manner as in preparation of the barrier rib photosensitive paste A. Next, to 60 parts by mass of the prepared organic solution 1 were added 39 parts by mass of the low-melting-point glass powder A and 1 part by mass of the high-melting-point glass powder A, followed by kneading the mixture by a three-roll kneader to prepare a barrier rib photosensitive paste E.

Barrier Rib Photosensitive Paste F: An organic solution 1 was prepared in the same manner as in preparation of the barrier rib photosensitive paste A. Next, to 60 parts by mass of the prepared organic solution 1 were added 25 parts by mass of the low-melting-point glass powder A and 15 parts by mass of the high-melting-point glass powder A, followed by kneading the mixture by a three-roll kneader to prepare a barrier rib photosensitive paste F.

Barrier Rib Photosensitive Paste G: An organic solution 1 was prepared in the same manner as in preparation of the barrier rib photosensitive paste A. Next, to 60 parts by mass of the prepared organic solution 1 were added 20 parts by mass of the low-melting-point glass powder A and 20 parts by mass of the high-melting-point glass powder A, followed by kneading the mixture by a three-roll kneader to prepare a barrier rib photosensitive paste G.

Barrier Rib Photosensitive Paste H: An organic solution 1 was prepared in the same manner as in preparation of the barrier rib photosensitive paste A. Next, to 60 parts by mass of the prepared organic solution 1 were added 30 parts by mass of the low-melting-point glass powder D and 10 parts by mass of the high-melting-point glass powder A, followed by kneading the mixture by a three-roll kneader to prepare a barrier rib photosensitive paste H.

Barrier Rib Photosensitive Paste I: 8 parts by mass of the photosensitive monomer M-1, 4 parts by mass of the photosensitive monomer M-3, 24 parts by mass of the photosensitive polymer, 4 parts by mass of the photo-polymerization initiator, 0.2 parts by mass of the polymerization inhibitor and 12.8 parts by mass of the ultraviolet ray absorber solution were dissolved in 38 parts by mass of the solvent A under heating at a temperature of 80° C. After the obtained solution was cooled, 9 parts by mass of the viscosity modifier were added to prepare an organic solution 3. The refractive index (ng) of an organic coating film obtained by applying the organic solution 3 to a glass substrate and drying the applied solution was 1.553.

Next, to 60 parts by mass of the prepared organic solution 3 were added 30 parts by mass of the low-melting-point glass powder A and 10 parts by mass of the high-melting-point glass powder A, followed by kneading the mixture by a three-roll kneader to prepare a barrier rib photosensitive paste I.

Barrier Rib Photosensitive Paste J: An organic solution 1 was prepared in the same manner as in preparation of the barrier rib photosensitive paste A. Next, to 60 parts by mass of the prepared organic solution 1 were added 40 parts by mass of the low-melting-point glass powder E, followed by kneading the mixture by a three-roll kneader to prepare a barrier rib photosensitive paste J.

Barrier Rib Photosensitive Paste K: An organic solution 3 was prepared in the same manner as in preparation of the barrier rib photosensitive paste I. Next, to 60 parts by mass of the prepared organic solution 3 were added 35 parts by mass of the low-melting-point glass powder F and 5 parts by mass of the high-melting-point glass powder A, followed by kneading the mixture by a three-roll kneader to prepare a barrier rib photosensitive paste K.

Barrier Rib Photosensitive Paste L: An organic solution 3 was prepared in the same manner as in preparation of the barrier rib photosensitive paste I. Next, to 60 parts by mass of the prepared organic solution 3 were added 35 parts by mass of the low-melting-point glass powder D and 5 parts by mass of the high-melting-point glass powder A, followed by kneading the mixture by a three-roll kneader to prepare a barrier rib photosensitive paste L.

Barrier Rib Photosensitive Paste M: An organic solution 1 was prepared in the same manner as in preparation of the barrier rib photosensitive paste A. Next, to 60 parts by mass of the prepared organic solution 1 were added 40 parts by mass of the glass powder G, followed by kneading the mixture by a three-roll kneader to prepare a barrier rib photosensitive paste M.

Barrier Rib Photosensitive Paste N: An organic solution 2 was prepared in the same manner as in preparation of the barrier rib photosensitive paste C. Next, to 60 parts by mass of the prepared organic solution 1 were added 30 parts by mass of the low-melting-point glass powder H and 10 parts by mass of the high-melting-point glass powder A, followed by kneading the mixture by a three-roll kneader to prepare a barrier rib photosensitive paste N.

Barrier Rib Screen Printing Paste A: 50 parts by mass of a terpineol solution containing 10% by mass of ethyl cellulose and 50 parts by mass of the low-melting-point glass powder A were mixed to prepare a screen printing paste A. The refractive index (ng) of an organic coating film obtained by applying a terpineol solution, which contained 10% by mass of ethyl cellulose, to a glass substrate and drying the applied solution was 1.49.

Barrier Rib Screen Printing Paste B: 50 parts by mass of a terpineol solution containing 10% by mass of ethyl cellulose, 40 parts by mass of the low-melting-point glass powder A and 10 parts by mass of the high-melting-point glass powder A were mixed to prepare a screen printing paste B.

(Raw Materials of Buffer Layer Paste)

Raw materials other than those used for the barrier rib paste will be described below.

Polymerizable monomer: Dipentaerythritol hexaacrylate (manufactured by KYOEISHA CHEMICAL CO., LTD.)

Thermal polymerization initiator: azobisisobutyronitrile

Titanium oxide powder: titanium oxide powder, average particle diameter: 0.1 µm (Preparation of Buffer Layer Paste)

To 97 parts by mass of the barrier rib photosensitive paste A were added 3 parts by mass of the titanium oxide powder, and the mixture was kneaded again to prepare a light-curing-type buffer layer paste A.

40 parts by mass of the terpineol solution containing 10% by mass of ethyl cellulose, 15 parts by mass of the polymerizable monomer, 1 part by mass of the thermal polymerization initiator, 40 parts by mass of the low-melting-point glass powder A and 4 parts by mass of the titanium oxide powder were mixed and kneaded to prepare a heat-curing-type buffer layer paste B.

40 parts by mass of the terpineol solution containing 10% by mass of ethyl cellulose, 15 parts by mass of the polymerizable monomer, 1 part by mass of the thermal polymerization initiator, 40 parts by mass of the low-melting-point glass powder D and 4 parts by mass of the titanium oxide powder were mixed and kneaded to prepare a heat-curing-type buffer layer paste C.

(Measurement of Reflectivity of Buffer Layer)

For a barrier rib member with a buffer layer and a barrier rib formed on a substrate, a part provided with only the buffer layer was measured by a spectral colorimeter ("CM-2002" manufactured by KONICA MINOLTA, INC) in an SCE mode, and a reflectivity of light having a wavelength of 550 nm was evaluated.

(Measurement of Phosphor Volume Filling Ratio)

The phosphor volume filling ratio was measured in the following manner. A difference between the weight of a barrier rib member with a buffer layer and a barrier rib formed on a substrate and the weight of a scintillator panel after filling of a phosphor was defined as a total weight of the filled phosphor. The calculated total weight of the phosphor was divided by the specific gravity of the phosphor to calculate a phosphor volumetric amount. Further, a calculated value obtained by dividing the phosphor volumetric amount by a space volumetric amount in all cells was defined as a phosphor volume filling ratio. Here, the all cell volumetric amount is a value obtained by multiplying a space volume in one cell divided by a barrier rib by the total number of cells included in a scintillator panel.

The space volume in one cell can be determined by calculation from the shape of the cell. For example, when the space shape of the cell is a square truncated pyramid in which the longitudinal and traverse barrier rib pitches, the barrier rib bottom width (Lb) and the barrier rib top width are each equal, a relationship of the space volume (V) in one cell, the barrier rib pitch (P), the barrier rib bottom width (Lb), the barrier rib top width (Lt) and the barrier rib height (H) is represented by the following formula 1.

$$V=\{(P-Lb)\times(P-Lt)+(P-Lb)^2+(P-Lt)^2\}\times H/3 \ldots \quad \text{(Formula 1)}$$

(Measurement of Warpage of Scintillator Panel)

The substrate side of a scintillator panel prepared was placed on a flat plate such as a glass plate, and a gap present between the flat plate and the scintillator panel was measured by a thickness gauge (manufactured by TRUSCO NAKAYAMA CORPORATION) and defined as an amount of warpage of the panel.

When the amount of warpage of the panel is 50 μm or less, the scintillator panel is smooth, and the variation in detection sensitivity of an amount of emitted light when the entire surface in the panel plane is made to emit light can be kept less than 2%, so that high-definition images can be detected. When the amount of warpage of the panel is more than 50 μm and no more than 100 μm, the variation in detection sensitivity of an amount of emitted light is slightly large, but the variation in detection sensitivity of an amount of emitted light when the entire surface in the panel plane is made to emit light can be kept less than 5%. When the amount of warpage of the panel is more than 100 μm, the variation in detection sensitivity of an amount of emitted light when the entire surface in the panel plane is made to emit light is 5% or more. Further, since crosstalk of emitted light occurs frequently, it is difficult to detect high-definition images.

(Measurement of Light Emission Luminance)

The prepared scintillator panel was set in any of PaxScan2520, PaxScan4336 and PaxScan3030 (FPDs manufactured by Varian Medical Systems, Inc.) to prepare a radiation detector. X rays at a tube voltage of 80 kVp were applied from the substrate side of the scintillator panel, and an amount of light emitted from a phosphor layer was detected by any of PaxScan2520, PaxScan4336 and PaxScan3030. The luminance was evaluated by relative evaluation to the results of Example 1.

(Evaluation of Image Defects)

The prepared scintillator panel was set in any of PaxScan2520, PaxScan4336 and PaxScan3030 to prepare a radiation detector. X rays at a tube voltage of 80 kVp were applied from the substrate side of the scintillator panel to photograph a solid image. This was reproduced as an image by an image reproducing device, and the obtained print image was visually observed to evaluate presence/absence of image defects, crosstalk and linear noises.

Example 1

The barrier rib photosensitive paste A was applied to a glass substrate of 500 mm×500 mm (OA-10 manufactured by Nippon Electric Glass Co. Ltd., thermal expansion coefficient: $38\times10^{-7}$, substrate thickness: 0.7 mm) by a die coater so as to have a dry thickness of 500 μm, and dried to form a barrier rib photosensitive paste coating film. Next, the barrier rib photosensitive paste coating film was exposed at 600 mJ/cm$^2$ by an ultra-high pressure mercury lamp through a photomask provided with an opening corresponding to a desired barrier rib pattern (chrome mask having a grid-like opening with both longitudinal and traverse pitches of 127 μm and a line width of 20 μm). The exposed barrier rib photosensitive paste coating film was developed in a 0.5% aqueous ethanolamine solution, so that an unexposed part was removed to form a grid-like photosensitive paste coating film pattern. Further, the photosensitive paste coating film pattern was fired in air at 585° C. for 15 minutes to obtain a barrier rib member having a grid-like barrier rib with a barrier rib pitch of 127 μm, a barrier rib top width of 25 μm, a barrier rib bottom width of 50 μm, a barrier rib height of 340 μm and a size of 480 mm×480 mm. The porosity of the barrier rib was 8.3%.

Thereafter, CsI:Tl (CsI:TlI=1 mol:0.003 mol), as a phosphor, was filled in spaces divided by the barrier rib, and firing was performed at 580° C. to prepare a scintillator panel 1 having a phosphor volume filling ratio of 85%. The substrate warpage amount of the scintillator panel 1 was no less than 50 μm and no more than 60 μm. As a result of evaluating a radiation detector including the prepared scintillator panel 1 and PaxScan2520, proper images, which were free from defects including linear noises and had a luminance variation of 2.5%, were obtained.

Example 2

The buffer layer paste A was applied to a glass substrate of 500 mm×500 mm (OA-10 manufactured by Nippon Electric Glass Co. Ltd.) by a 15 μm bar coater, and dried, and its entire surface was then irradiated with light at 500 mJ/cm$^2$ by an ultra-high pressure mercury lamp to form a buffer layer paste coating film having a thickness of 12 μm.

Next, the barrier rib photosensitive paste A was applied onto the buffer layer paste coating film by a die coater so as to have a dry thickness of 500 μm, and dried to form a barrier rib photosensitive paste coating film. Next, the barrier rib photosensitive paste coating film was exposed at 600 mJ/cm$^2$ by an ultra-high pressure mercury lamp through a photomask having an opening corresponding to a desired barrier rib pattern (chrome mask having a grid-like opening with both longitudinal and traverse pitches of 127 μm and a line width of 20 μm). The exposed barrier rib photosensitive paste coating film was developed in a 0.5% aqueous ethanolamine solution, so that an unexposed part was removed to form a grid-like photosensitive paste coating film pattern. Further, the buffer layer paste coating film and the photosensitive paste coating film pattern were simultaneously fired in air at 585° C. for 15 minutes to obtain a barrier rib member having a grid-like barrier rib with a barrier rib pitch of 127 μm, a barrier rib top width of 25 μm, a barrier rib bottom width of 50 μm, a barrier rib height of 340 μm and a size of 480 mm×480 mm. A part provided with only the buffer layer had a reflectivity of 65% to light having a wavelength of 550 nm. The porosity of the barrier rib was 8.0%.

Thereafter, CsI:Tl (CsI:TlI=1 mol:0.003 mol), as a phosphor, was filled in spaces divided by the barrier rib, and firing was performed at 580° C. to prepare a scintillator panel 2 having a phosphor volume filling ratio of 85%. The substrate warpage amount of the scintillator panel 2 was no less than 70 μm and no more than 80 μm. As a result of evaluating a radiation detector including the prepared scintillator panel 2 and PaxScan2520, proper images, which were free from defects including linear noises and had a luminance variation of 3.5%, were obtained, and the luminance was 130% with respect to Example 1.

Example 3

A barrier rib member was prepared in the same manner as in Example 2 except that the barrier rib photosensitive paste B was used, and firing was performed at 645° C. for 15 minutes. The barrier rib of the obtained barrier rib member was a grid-like barrier rib with a barrier rib pitch of 127 μm, a barrier rib top width of 22 μm, a barrier rib bottom width of 60 μm, a barrier rib height of 325 μm and a size of 480 mm×480 mm. A part provided with only the buffer layer had a reflectivity of 53% to light having a wavelength of 550 nm. The porosity of the barrier rib was 9.5%.

Thereafter, CsI:Tl (CsI:TlI=1 mol:0.003 mol), as a phosphor, was filled in spaces divided by the barrier rib, and firing was performed at 580° C. to prepare a scintillator panel 3 having a phosphor volume filling ratio of 85%. The substrate warpage amount of the scintillator panel 3 was 30 μm or less. As a result of evaluating a radiation detector including the prepared scintillator panel 3 and PaxScan2520, proper images, which were free from defects including linear noises and had a luminance variation of 1.0%, were obtained, and the luminance was 106% with respect to Example 1.

Example 4

A barrier rib member was prepared in the same manner as in Example 2 except that the barrier rib photosensitive paste C was used, and firing was performed at 540° C. for 15 minutes. The barrier rib of the obtained barrier rib member was a grid-like barrier rib with a barrier rib pitch of 127 μm, a barrier rib top width of 23 μm, a barrier rib bottom width of 55 μm, a barrier rib height of 320 μm and a size of 480 mm×480 mm. A part provided with only the buffer layer had a reflectivity of 70% to light having a wavelength of 550 nm. The porosity of the barrier rib was 4.4%.

Thereafter, CsI:Tl (CsI:TlI=1 mol:0.003 mol), as a phosphor, was filled in spaces divided by the barrier rib, and firing was performed at 560° C. to prepare a scintillator panel 4 having a phosphor volume filling ratio of 85%. The substrate warpage amount of the scintillator panel 4 was no less than 130 μm and no more than 150 μm. As a result of evaluating a radiation detector including the prepared scintillator panel 4 and PaxScan2520, the luminance was 110% with respect to Example 1, and the luminance variation was 6.5%.

Example 5

A barrier rib member was prepared in the same manner as in Example 2 except that the barrier rib photosensitive paste D was used. The barrier rib of the obtained barrier rib member was a grid-like barrier rib with a barrier rib pitch of 127 μm, a barrier rib top width of 24 μm, a barrier rib bottom width of 53 μm, a barrier rib height of 320 μm and a size of 480 mm×480 mm. A part provided with only the buffer layer had a reflectivity of 65% to light having a wavelength of 550 nm. The porosity of the barrier rib was 0.8%.

Thereafter, CsI:Tl (CsI:TlI=1 mol:0.003 mol), as a phosphor, was filled in spaces divided by the barrier rib, and firing was performed at 580° C. to prepare a scintillator panel 5 having a phosphor volume filling ratio of 85%. The substrate warpage amount of the scintillator panel 5 was no less than 130 μm and no more than 150 μm. As a result of evaluating a radiation detector including the prepared scintillator panel 5 and PaxScan2520, the luminance was 105% with respect to Example 1, and the luminance variation was 6.0%.

Example 6

A barrier rib member was prepared in the same manner as in Example 2 except that the barrier rib photosensitive paste E was used. The barrier rib of the obtained barrier rib member was a grid-like barrier rib with a barrier rib pitch of 127 μm, a barrier rib top width of 24 μm, a barrier rib bottom width of 53 μm, a barrier rib height of 320 μm and a size of 480 mm×480 mm. A part provided with only the buffer layer had a reflectivity of 65% to light having a wavelength of 550 nm. The porosity of the barrier rib was 2.0%.

Thereafter, CsI:Tl (CsI:TlI=1 mol:0.003 mol), as a phosphor, was filled in spaces divided by the barrier rib, and firing was performed at 580° C. to prepare a scintillator panel 6 having a phosphor volume filling ratio of 85%. The substrate warpage amount of the scintillator panel 6 was no less than 90 μm and no more than 100 μm. As a result of evaluating a radiation detector including the prepared scintillator panel 6 and PaxScan2520, proper images, which were free from defects including linear noises and had a luminance variation of 4.7%, were obtained, and the luminance was 120% with respect to Example 1.

Example 7

A barrier rib member was prepared in the same manner as in Example 2 except that the barrier rib photosensitive paste F was used. The barrier rib of the obtained barrier rib member was a grid-like barrier rib with a barrier rib pitch of 127 μm, a barrier rib top width of 34 μm, a barrier rib bottom width of 60 μm, a barrier rib height of 370 μm and a size of 480 mm×480 mm. A part provided with only the buffer layer had a reflectivity of 65% to light having a wavelength of 550 nm. The porosity of the barrier rib was 24.8%.

Thereafter, CsI:Tl (CsI:TlI=1 mol:0.003 mol), as a phosphor, was filled in spaces divided by the barrier rib, and firing was performed at 580° C. to prepare a scintillator panel 7 having a phosphor volume filling ratio of 85%. The substrate warpage amount of the scintillator panel 7 was no less than 50 μm and no more than 60 μm. As a result of evaluating a radiation detector including the prepared scintillator panel 7 and PaxScan2520, proper images, which were free from defects including linear noises and had a luminance variation of 2.2%, were obtained, and the luminance was 140% with respect to Example 1.

Example 8

A barrier rib member was prepared in the same manner as in Example 2 except that the barrier rib photosensitive paste G was used. The barrier rib of the obtained barrier rib member was a grid-like barrier rib with a barrier rib pitch of 127 μm, a barrier rib top width of 35 μm, a barrier rib bottom width of 60 μm, a barrier rib height of 380 μm and a size of 480 mm×480 mm. A part provided with only the buffer layer had a reflectivity of 65% to light having a wavelength of 550 nm. The porosity of the barrier rib was 32.3%.

Thereafter, CsI:Tl (CsI:TlI=1 mol:0.003 mol), as a phosphor, was filled in spaces divided by the barrier rib, and firing was performed at 580° C. to prepare a scintillator panel 8 having a phosphor volume filling ratio of 85%. The substrate warpage amount of the scintillator panel 8 was no less than 50 μm and no more than 60 μm. As a result of evaluating a radiation detector including the prepared scintillator panel 8 and PaxScan2520, the luminance was 140% with respect to Example 1, and the luminance variation was 2.1%. However, image defects occurred at 15 locations in the plane.

Example 9

A barrier rib member was prepared in the same manner as in Example 2 except that the barrier rib photosensitive paste H was used, and firing was performed at 620° C. for 15 minutes. The barrier rib of the obtained barrier rib member was a grid-like barrier rib with a barrier rib pitch of 127 μm, a barrier rib top width of 25 μm, a barrier rib bottom width of 40 μm, a barrier rib height of 340 μm and a size of 480 mm×480 mm. A part provided with only the buffer layer had a reflectivity of 60% to light having a wavelength of 550 nm. The porosity of the barrier rib was 9.4%.

Thereafter, CsI:Tl (CsI:TlI=1 mol:0.003 mol), as a phosphor, was filled in spaces divided by the barrier rib, and firing was performed at 580° C. to prepare a scintillator panel 9 having a phosphor volume filling ratio of 85%. The substrate warpage amount of the scintillator panel 9 was no less than 30 μm and no more than 40 μm. As a result of evaluating a radiation detector including the prepared scintillator panel 9 and PaxScan2520, proper images, which were free from defects including linear noises and had a luminance variation of 1.2%, were obtained, and the luminance was 135% with respect to Example 1.

Example 10

A barrier rib member was prepared in the same manner as in Example 2 except that the buffer layer paste B was applied to a glass substrate of 500 mm×500 mm (OA-10 manufactured by Nippon Electric Glass Co. Ltd.) by a 15 μm bar coater, and dried/heated at 150° C. for 30 minutes to be cured, thereby forming a buffer layer paste coating film having a thickness of 12 μm. The barrier rib of the obtained barrier rib member was a grid-like barrier rib with a barrier rib pitch of 127 μm, a barrier rib top width of 25 μm, a barrier rib bottom width of 48 μm, a barrier rib height of 340 μm and a size of 480 mm×480 mm. A part provided with only the buffer layer had a reflectivity of 66% to light having a wavelength of 550 nm. The porosity of the barrier rib was 8.1%.

Thereafter, CsI:Tl (CsI:TlI=1 mol:0.003 mol), as a phosphor, was filled in spaces divided by the barrier rib, and firing was performed at 580° C. to prepare a scintillator panel 10 having a phosphor volume filling ratio of 85%. The substrate warpage amount of the scintillator panel 10 was no less than 70 μm and no more than 80 μm. As a result of evaluating a radiation detector including the prepared scintillator panel 10 and PaxScan2520, proper images, which were free from defects including linear noises and had a luminance variation of 3.5%, were obtained, and the luminance was 141% with respect to Example 1.

Example 11

The buffer layer paste B was applied to a glass substrate of 500 mm×500 mm (OA-10 manufactured by Nippon Electric Glass Co. Ltd.) by a 15 μm bar coater, and dried and heated at 150° C. for 30 minutes to be cured, thereby forming a buffer layer paste coating film having a thickness of 12 μm. The buffer layer paste coating film formed on the substrate was fired in air at 585° C. for 15 minutes to form a buffer layer. Subsequently, a barrier rib photosensitive paste was formed, and a grid-like photosensitive paste coating film pattern was formed in the same manner as in Example 2. Further, the photosensitive paste coating film pattern was fired in air at 585° C. for 15 minutes. The barrier rib of the obtained barrier rib member was a grid-like barrier rib with a barrier rib pitch of 127 μm, a barrier rib top width of 25 μm, a barrier rib bottom width of 51 μm, a barrier rib height of 340 μm and a size of 480 mm×480 mm. A part provided with only the buffer layer had a reflectivity of 60% to light having a wavelength of 550 nm. The porosity of the barrier rib was 8.1%.

Thereafter, CsI:Tl (CsI:TlI=1 mol:0.003 mol), as a phosphor, was filled in spaces divided by the barrier rib, and firing was performed at 580° C. to prepare a scintillator panel 11 having a phosphor volume filling ratio of 85%. The substrate warpage amount of the scintillator panel 11 was no less than 90 μm and no more than 100 μm. As a result of evaluating a radiation detector including the prepared scintillator panel 11 and PaxScan2520, proper images, which were free from defects including linear noises and had a luminance variation of 4.4%, were obtained, and the luminance was 132% with respect to Example 1.

Example 12

A barrier rib member was prepared in the same manner as in Example 10 except that the barrier rib photosensitive paste I was used. The barrier rib of the obtained barrier rib member was a grid-like barrier rib with a barrier rib pitch of 127 μm, a barrier rib top width of 25 μm, a barrier rib bottom width of 60 μm, a barrier rib height of 340 μm and a size of 480 mm×480 mm. A part provided with only the buffer layer had a reflectivity of 65% to light having a wavelength of 550 nm. The porosity of the barrier rib was 8.2%.

Thereafter, CsI:Tl (CsI:TlI=1 mol:0.003 mol), as a phosphor, was filled in spaces divided by the barrier rib, and firing was performed at 580° C. to prepare a scintillator panel 12 having a phosphor volume filling ratio of 85%. The substrate warpage amount of the scintillator panel 12 was no less than 70 μm and no more than 80 μm. As a result of evaluating a radiation detector including the prepared scintillator panel 12 and PaxScan2520, proper images, which were free from defects including linear noises and had a luminance variation of 3.5%, were obtained, and the luminance was 135% with respect to Example 1.

Example 13

A barrier rib member was prepared in the same manner as in Example 1 except that the barrier rib photosensitive paste J was used, and firing was performed at 565° C. for 15 minutes. However, although the amount of exposure during exposure of the photosensitive paste coating film was adjusted, embedment occurred at part of the photosensitive paste pattern, so that a barrier rib having a uniform barrier rib width in the plane was not obtained. The barrier rib formed by performing exposure at 500 mJ/cm$^2$ as an appropriate amount of exposure by an ultra-high pressure mercury lamp was a grid-like barrier rib with a barrier rib pitch of 127 μm, a barrier rib top width of 25 μm, a barrier rib bottom width of 75 μm, a barrier rib height of 340 μm and a size of 480 mm×480 mm when the barrier rib was measured at a location where embedment did not occur. A part provided with only the buffer layer had a reflectivity of 67% to light having a wavelength of 550 nm, but sintering of the low-melting-point glass of the buffer paste did not proceed, and the interface between the barrier rib and the buffer layer was cracked. The porosity of the barrier rib was 3.0%.

Thereafter, CsI:Tl (CsI:TlI=1 mol:0.003 mol), as a phosphor, was filled in spaces divided by the barrier rib, and firing was performed at 550° C. to prepare a scintillator panel 13 having a phosphor volume filling ratio of 85%. The substrate warpage amount of the scintillator panel 13 was no less than 90 μm and no more than 100 μm. As a result of evaluating the prepared scintillator panel 13, the luminance was 110% with respect to Example 1, and the luminance variation was 4.2%.

Example 14

A buffer layer paste coating film was formed on a glass substrate in the same manner as in Example 2. Next, the barrier rib photosensitive paste A was applied by a die coater so as to have a dry thickness of 590 μm, and dried to form a barrier rib photosensitive paste coating film. Next, the barrier rib photosensitive paste coating film was exposed at 750 mJ/cm$^2$ by an ultra-high pressure mercury lamp through a photomask provided with an opening corresponding to a desired barrier rib pattern (chrome mask having a grid-like opening with both longitudinal and traverse pitches of 127 μm and a line width of 20 μm). The exposed barrier rib photosensitive paste coating film was developed in a 0.5% aqueous ethanolamine solution, so that an unexposed part was removed to form a grid-like photosensitive paste coating film pattern. Further, the buffer layer paste coating film and the photosensitive paste coating film pattern were simultaneously fired in air at 585° C. for 15 minutes to obtain a barrier rib member having a grid-like barrier rib with a barrier rib pitch of 127 μm, a barrier rib top width of 27 μm, a barrier rib bottom width of 65 μm, a barrier rib height of 400 μm and a size of 480 mm×480 mm. A part provided with only the buffer layer had a reflectivity of 65% to light having a wavelength of 550 nm. The porosity of the barrier rib was 8.1%.

Thereafter, CsI:Tl (CsI:TlI=1 mol:0.003 mol), as a phosphor, was filled in spaces divided by the barrier rib, and firing was performed at 580° C. to prepare a scintillator panel 14 having a phosphor volume filling ratio of 71%. The substrate warpage amount of the scintillator panel 14 was no less than 60 μm and no more than 70 μm. As a result of evaluating a radiation detector including the prepared scintillator panel 14 and PaxScan2520, proper images, which were free from defects including linear noises and had a luminance variation of 3.2%, were obtained, and the luminance was 119% with respect to Example 1.

Example 15

A buffer layer paste coating film was formed on a glass substrate in the same manner as in Example 2. Next, the barrier rib photosensitive paste A was applied by a die coater so as to have a dry thickness of 740 μm, and dried to form a barrier rib photosensitive paste coating film. Next, the barrier rib photosensitive paste coating film was exposed at 950 mJ/cm$^2$ by an ultra-high pressure mercury lamp through a photomask provided with an opening corresponding to a desired barrier rib pattern (chrome mask having a grid-like opening with both longitudinal and traverse pitches of 194 μm and a line width of 20 μm). The exposed barrier rib photosensitive paste coating film was developed in a 0.5% aqueous ethanolamine solution, so that an unexposed part was removed to form a grid-like photosensitive paste coating film pattern. Further, the buffer layer paste coating film and the photosensitive paste coating film pattern were simultaneously fired in air at 585° C. for 15 minutes to obtain a barrier rib member having a grid-like barrier rib with a barrier rib pitch of 194 μm, a barrier rib top width of 28 μm, a barrier rib bottom width of 58 μm, a barrier rib height of 500 μm and a size of 480 mm×480 mm. A part provided with only the buffer layer had a reflectivity of 64% to light having a wavelength of 550 nm. The porosity of the barrier rib was 7.9%.

Thereafter, CsI:Tl (CsI:TlI=1 mol:0.003 mol), as a phosphor, was fully filled in spaces divided by the barrier rib, and firing was performed at 580° C. to prepare a scintillator panel 15 having a phosphor volume filling ratio of 60%. The substrate warpage amount of the scintillator panel 15 was no less than 70 μm and no more than 80 μm.

As a result of evaluating a radiation detector including the prepared scintillator panel 15 and PaxScan3030, proper images, which were free from defects including linear noises and had a luminance variation of 3.8%, were obtained, and the luminance was 109% with respect to Example 1.

Example 16

A buffer layer paste coating film was formed on a glass substrate in the same manner as in Example 2. Next, the barrier rib photosensitive paste A was applied by a die coater so as to have a dry thickness of 210 μm, and dried to form a barrier rib photosensitive paste coating film. Next, the barrier rib photosensitive paste coating film was exposed at 450 mJ/cm$^2$ by an ultra-high pressure mercury lamp through a photomask provided with an opening corresponding to a desired barrier rib pattern (chrome mask having a grid-like opening with both longitudinal and traverse pitches of 63.5 μm and a line width of 14 μm). The exposed barrier rib photosensitive paste coating film was developed in a 0.5% aqueous ethanolamine solution, so that an unexposed part was removed to form a grid-like photosensitive paste coating film pattern. Further, the buffer layer paste coating film and the photosensitive paste coating film pattern were simultaneously fired in air at 585° C. for 15 minutes to obtain a barrier rib member having a grid-like barrier rib with a barrier rib pitch of 63.5 μm, a barrier rib top width of 16 μm, a barrier rib bottom width of 22 μm, a barrier rib height of 160 μm and a size of 480 mm×480 mm. A part provided with only the buffer layer had a reflectivity of 64% to light having a wavelength of 550 nm. The porosity of the barrier rib was 7.9%.

Thereafter, CsI:Tl (CsI:TlI=1 mol:0.003 mol), as a phosphor, was filled in spaces divided by the barrier rib, and firing was performed at 580° C. to prepare a scintillator panel 16 having a phosphor volume filling ratio of 85%. The substrate warpage amount of the scintillator panel 16 was no less than 60 μm and no more than 70 μm. As a result of evaluating a radiation detector including the prepared scintillator panel 16 and PaxScan2520, proper images, which were free from defects including linear noises and had a luminance variation of 3.0%, were obtained, and the luminance was 92% with respect to Example 1.

Example 17

A buffer layer paste coating film was formed on a glass substrate in the same manner as in Example 2. Next, the barrier rib photosensitive paste A was applied by a die coater so as to have a dry thickness of 680 μm, and dried to form a barrier rib photosensitive paste coating film. Next, the barrier rib photosensitive paste coating film was exposed at 820 mJ/cm$^2$ by an ultra-high pressure mercury lamp through a photomask provided with an opening corresponding to a desired barrier rib pattern (chrome mask having a grid-like opening with both longitudinal and traverse pitches of 139 μm and a line width of 20 μm). The exposed barrier rib photosensitive paste coating film was developed in a 0.5% aqueous ethanolamine solution, so that an unexposed part was removed to form a grid-like photosensitive paste coating film pattern. Further, the buffer layer paste coating film and the photosensitive paste coating film pattern were simultaneously fired in air at 585° C. for 15 minutes to obtain a barrier rib member having a grid-like barrier rib with a barrier rib pitch of 139 μm, a barrier rib top width of 26 μm, a barrier rib bottom width of 51 μm, a barrier rib height of 450 μm and a size of 480 mm×480 mm. A part provided with only the buffer layer had a reflectivity of 65% to light having a wavelength of 550 nm. The porosity of the barrier rib was 8.1%.

Thereafter, CsI:Tl (CsI:TlI=1 mol:0.003 mol), as a phosphor, was filled in spaces divided by the barrier rib, and firing was performed at 580° C. to prepare a scintillator panel 17 having a phosphor volume filling ratio of 85%. The substrate warpage amount of the scintillator panel 17 was no less than 60 μm and no more than 70 μm. As a result of evaluating a radiation detector including the prepared scintillator panel 17 and PaxScan4336, proper images, which were free from defects including linear noises and had a luminance variation of 3.6%, were obtained, and the luminance was 140% with respect to Example 1.

Example 18

A barrier rib member was prepared in the same manner as in Example 10 except that the barrier rib photosensitive paste K and the buffer layer paste C were used, and firing was performed at 650° C. for 15 minutes. The barrier rib of the obtained barrier rib member was a grid-like barrier rib with a barrier rib pitch of 127 µm, a barrier rib top width of 24 µm, a barrier rib bottom width of 70 µm, a barrier rib height of 370 µm and a size of 480 mm×480 mm. A part provided with only the buffer layer had a reflectivity of 66% to light having a wavelength of 550 nm. The porosity of the barrier rib was 14.1%.

Thereafter, CsI:Tl (CsI:TlI=1 mol:0.003 mol), as a phosphor, was filled in spaces divided by the barrier rib, and firing was performed at 580° C. to prepare a scintillator panel 18 having a phosphor volume filling ratio of 85%. The substrate warpage amount of the scintillator panel 18 was 30 µm or less. As a result of evaluating a radiation detector including the prepared scintillator panel 18 and PaxScan2520, proper images, which were free from defects including linear noises and had a luminance variation of 1.3%, were obtained, and the luminance was 128% with respect to Example 1.

Example 19

A buffer layer paste coating film was formed on a glass substrate in the same manner as in Example 10. Next, the barrier rib photosensitive paste H was applied by a die coater so as to have a dry thickness of 290 µm, and dried to form a barrier rib photosensitive paste coating film. Next, the barrier rib photosensitive paste coating film was exposed at 550 mJ/cm$^2$ by an ultra-high pressure mercury lamp through a photomask provided with an opening corresponding to a desired barrier rib pattern (chrome mask having a grid-like opening with both longitudinal and traverse pitches of 127 µm and a line width of 20 µm). The exposed barrier rib photosensitive paste coating film was developed in a 0.5% aqueous ethanolamine solution, so that an unexposed part was removed to form a grid-like photosensitive paste coating film pattern. Further, the buffer layer paste coating film and the photosensitive paste coating film pattern were simultaneously fired in air at 620° C. for 15 minutes to obtain a barrier rib member having a grid-like barrier rib with a barrier rib pitch of 127 µm, barrier rib top width of 20 µm, a barrier rib bottom width of 30 µm, a barrier rib height of 200 µm and a size of 480 mm×480 mm. A part provided with only the buffer layer had a reflectivity of 61% to light having a wavelength of 550 nm. The porosity of the barrier rib was 9.0%.

Thereafter, CsI:Tl (CsI:TlI=1 mol:0.003 mol), as a phosphor, was filled in spaces divided by the barrier rib, and firing was performed at 580° C. to prepare a scintillator panel 19 having a phosphor volume filling ratio of 85%. The substrate warpage amount of the scintillator panel 19 was no less than 30 µm and no more than 40 µm. As a result of evaluating a radiation detector including the prepared scintillator panel 19 and PaxScan2520, proper images, which were free from defects including linear noises and had a luminance variation of 0.9%, were obtained, and the luminance was 96% with respect to Example 1.

Example 20

A barrier rib member was prepared in the same manner as in Example 19 except that the dry thickness of the barrier rib photosensitive paste H was 360 µm, and exposure was performed at 600 mJ/cm$^2$ by an ultra-high pressure mercury lamp. The barrier rib of the obtained barrier rib member was a grid-like barrier rib with a barrier rib pitch of 127 µm, a barrier rib top width of 22 µm, a barrier rib bottom width of 35 µm, a barrier rib height of 250 µm and a size of 480 mm×480 mm. A part provided with only the buffer layer had a reflectivity of 61% to light having a wavelength of 550 nm. The porosity of the barrier rib was 9.2%.

Thereafter, CsI:Tl (CsI:TlI=1 mol:0.003 mol), as a phosphor, was filled in spaces divided by the barrier rib, and firing was performed at 580° C. to prepare a scintillator panel 20 having a phosphor volume filling ratio of 90%. The substrate warpage amount of the scintillator panel 20 was no less than 30 µm and no more than 40 µm. As a result of evaluating a radiation detector including the prepared scintillator panel 20 and PaxScan2520, proper images, which were free from defects including linear noises and had a luminance variation of 1.8%, were obtained, and the luminance was 115% with respect to Example 1.

Example 21

A buffer layer paste coating film was formed on a glass substrate in the same manner as in Example 15. Next, the barrier rib photosensitive paste A was applied by a die coater so as to have a dry thickness of 580 µm, and dried to form a barrier rib photosensitive paste coating film. Next, the barrier rib photosensitive paste coating film was exposed at 1000 mJ/cm$^2$ by an ultra-high pressure mercury lamp through a photomask provided with an opening corresponding to a desired barrier rib pattern (chrome mask having a grid-like opening with both longitudinal and traverse pitches of 194 µm and a line width of 20 µm). The exposed barrier rib photosensitive paste coating film was developed in a 0.5% aqueous ethanolamine solution, so that an unexposed part was removed to form a grid-like photosensitive paste coating film pattern. Further, the buffer layer paste coating film and the photosensitive paste coating film pattern were simultaneously fired in air at 585° C. for 15 minutes to obtain a barrier rib member having a grid-like barrier rib with a barrier rib pitch of 194 µm, a barrier rib top width of 25 µm, a barrier rib bottom width of 50 µm, a barrier rib height of 400 µm and a size of 480 mm×480 mm. A part provided with only the buffer layer had a reflectivity of 66% to light having a wavelength of 550 nm. The porosity of the barrier rib was 8.5%.

Thereafter, CsI:Tl (CsI:TlI=1 mol:0.003 mol), as a phosphor, was fully filled in spaces divided by the barrier rib, and firing was performed at 580° C. to prepare a scintillator panel 21 having a phosphor volume filling ratio of 50%. The substrate warpage amount of the scintillator panel 21 was no less than 50 µm and no more than 60 µm.

As a result of evaluating a radiation detector including the prepared scintillator panel 21 and PaxScan3030, proper images, which were free from defects including linear noises and had a luminance variation of 2.1%, were obtained, and the luminance was 94% with respect to Example 1.

Example 22

A barrier rib member was prepared in the same manner as in Example 19 except that the dry thickness of the barrier rib photosensitive paste H was 500 µm, and exposure was performed at 600 mJ/cm$^2$ by an ultra-high pressure mercury lamp. The barrier rib of the obtained barrier rib member was a grid-like barrier rib with a barrier rib pitch of 127 µm, a barrier rib top width of 24 µm, a barrier rib bottom width of 45 µm, a barrier rib height of 340 µm and a size of 480 mm×480 mm. A part provided with only the buffer layer had a reflectivity of 61% to light having a wavelength of 550 nm. The porosity of the barrier rib was 9.2%.

Thereafter, CsI:Tl (CsI:TlI=1 mol:0.003 mol), as a phosphor, was filled in spaces divided by the barrier rib, and firing was performed at 580° C. to prepare a scintillator panel 22 having a phosphor volume filling ratio of 66%. The substrate warpage amount of the scintillator panel 22 was no less than 30 µm and no more than 40 µm. As a result of evaluating a radiation detector including the prepared scintillator panel 22 and PaxScan2520, proper images, which were free from defects including linear noises and had a luminance variation of 1.4%, were obtained, and the luminance was 108% with respect to Example 1.

Example 23

A barrier rib member was prepared in the same manner as in Example 22 using the barrier rib photosensitive paste H. The barrier rib of the obtained barrier rib member was a grid-like barrier rib with a barrier rib pitch of 127 µm, a barrier rib top width of 25 µm, a barrier rib bottom width of 50 µm, a barrier rib height of 340 µm and a size of 480 mm×480 mm. A part provided with only the buffer layer had a reflectivity of 62% to light having a wavelength of 550 nm. The porosity of the barrier rib was 9.4%.

Thereafter, CsI:Tl (CsI:TlI=1 mol:0.003 mol), as a phosphor, was filled in spaces divided by the barrier rib, and firing was performed at 580° C. to prepare a scintillator panel 23 having a phosphor volume filling ratio of 105%. The substrate warpage amount of the scintillator panel 23 was no less than 50 µm and no more than 60 µm. As a result of evaluating a radiation detector including the prepared scintillator panel 23 and PaxScan2520, crosstalk of emitted light occurred at 20 locations in the plane, but images were obtained, and the luminance was 145% with respect to Example 1.

Example 24

A buffer layer paste coating film was formed on a glass substrate in the same manner as in Example 10. Next, the barrier rib photosensitive paste A was applied by a die coater so as to have a dry thickness of 1000 µm, and dried to form a barrier rib photosensitive paste coating film. Next, the barrier rib photosensitive paste coating film was exposed at 1750 mJ/cm² by an ultra-high pressure mercury lamp through a photomask provided with an opening corresponding to a desired barrier rib pattern (chrome mask having a grid-like opening with both longitudinal and traverse pitches of 508 µm and a line width of 35 µm). The exposed barrier rib photosensitive paste coating film was developed in a 0.5% aqueous ethanolamine solution, so that an unexposed part was removed to form a grid-like photosensitive paste coating film pattern. Further, the buffer layer paste coating film and the photosensitive paste coating film pattern were simultaneously fired in air at 585° C. for 15 minutes to obtain a barrier rib member having a grid-like barrier rib with a barrier rib pitch of 508 µm, a barrier rib top width of 45 µm, a barrier rib bottom width of 100 µm, a barrier rib height of 700 µm and a size of 480 mm×480 mm. A part provided with only the buffer layer had a reflectivity of 65% to light having a wavelength of 550 nm. The porosity of the barrier rib was 10.2%.

Thereafter, CsI:Tl (CsI:TlI=1 mol:0.003 mol), as a phosphor, was filled in spaces divided by the barrier rib, and firing was performed at 580° C. to prepare a scintillator panel 24 having a phosphor volume filling ratio of 85%. The substrate warpage amount of the scintillator panel 24 was no less than 130 µm and no more than 150 µm. As a result of evaluating a radiation detector including the prepared scintillator panel 24 and PaxScan2520, images having periodical detection unevenness for every four pixels were obtained. The luminance was 115% with respect to Example 1.

Example 25

A barrier rib member was prepared in the same manner as in Example 19 except that the barrier rib photosensitive paste H and the buffer layer paste C were used, the thickness of the photosensitive paste coating film was 620 µm, and exposure was performed at 700 mJ/cm² by an ultra-high pressure mercury lamp. The barrier rib of the obtained barrier rib member was a grid-like barrier rib with a barrier rib pitch of 127 µm, a barrier rib top width of 25 µm, a barrier rib bottom width of 37 µm, a barrier rib height of 420 µm and a size of 480 mm×480 mm. A part provided with only the buffer layer had a reflectivity of 68% to light having a wavelength of 550 nm. The porosity of the barrier rib was 9.4%.

Thereafter, CsI:Tl (CsI:TlI=1 mol:0.003 mol), as a phosphor, was filled in spaces divided by the barrier rib, and firing was performed at 580° C. to prepare a scintillator panel 25 having a phosphor volume filling ratio of 85%. The substrate warpage amount of the scintillator panel 25 was no less than 40 µm and no more than 50 µm. As a result of evaluating a radiation detector including the prepared scintillator panel 25 and PaxScan2520, proper images, which were free from defects including linear noises and had a luminance variation of 1.8%, were obtained, and the luminance was 152% with respect to Example 1.

Example 26

The buffer layer paste A was applied to a glass substrate of 500 mm×500 mm (OA-10 manufactured by Nippon Electric Glass Co. Ltd.) by a 15 µm bar coater, and dried, and its entire surface was then irradiated with light at 500 mJ/cm² to form a buffer layer of about 12 µm.

Next, the barrier rib photosensitive paste was applied by a die coater so as to have a dry thickness of 400 µm, and dried. Next, exposure was performed through a photomask provided with an opening corresponding to a barrier rib pattern (chrome mask having a grid-like opening with both longitudinal and traverse pitches of 160 µm and a line width of 20 µm). After exposure, development was performed in a 0.5% aqueous ethanolamine solution, and further firing was performed in air at 585° C. for 15 minutes to obtain a barrier rib member having a grid-like barrier rib with a barrier rib pitch of 160 µm, a barrier rib top width of 30 µm, a barrier rib bottom width of 55 µm, a barrier rib height of 340 µm and a size of 480 mm×480 mm. A part provided with only the buffer layer had a reflectivity of 72% to light having a wavelength of 550 nm. The porosity of the barrier rib was 8.3%.

Thereafter, CsI:Tl (CsI:TlI=1 mol:0.003 mol) was filled in spaces divided by the barrier rib, and firing was performed at 580° C. to prepare a scintillator panel 26 having a phosphor volume filling ratio of 85%.

The substrate warpage amount of the prepared scintillator panel 26 was no less than 70 µm and no more than 80 µm. As a result of evaluating a radiation detector including the prepared scintillator panel 26 and PaxScan2520, proper images, which were free from defects including linear noises and had a luminance variation of 3.5%, were obtained, and the luminance was 108% with respect to Example 1.

Example 27

A barrier rib member was prepared in the same manner as in Example 3 except that the buffer layer paste A was applied by a 30 μm bar coater, and dried, and its entire surface was then irradiated with light at 600 mJ/cm² by an ultra-high pressure mercury lamp to form a buffer layer paste coating film having a thickness of 23 μm. The barrier rib of the obtained barrier rib member was a grid-like barrier rib with a barrier rib pitch of 127 μm, a barrier rib top width of 22 μm, a barrier rib bottom width of 55 μm, a barrier rib height of 325 μm and a size of 480 mm×480 mm. A part provided with only the buffer layer had a reflectivity of 64% to light having a wavelength of 550 nm. The porosity of the barrier rib was 9.5%.

Thereafter, CsI:Tl (CsI:TlI=1 mol:0.003 mol), as a phosphor, was filled in spaces divided by the barrier rib, and firing was performed at 580° C. to prepare a scintillator panel 3 having a phosphor volume filling ratio of 95%. The substrate warpage amount of the scintillator panel 3 was no less than 30 μm and no more than 40 μm. As a result of evaluating a radiation detector including the prepared scintillator panel 27 and PaxScan2520, proper images, which were free from defects including linear noises and had a luminance variation of 1.9%, were obtained, and the luminance was 128% with respect to Example 1.

Comparative Example 1

The buffer layer screen printing paste B was applied to a glass substrate of 500 mm×500 mm (OA-10 manufactured by Nippon Electric Glass Co. Ltd.) in a film thickness of 15 μm by screen printing, and dried to form a buffer layer paste coating film. The barrier rib screen printing glass paste A was then repeatedly applied in a film thickness of 40 μm by screen printing, and dried for 12 layers using a pattern having pitches of 160 μm in longitudinal and traverse directions, an opening length of 130 μm×130 μm, a barrier rib width of 35 μm and a size appropriate to a predetermined number of pixels. Thereafter, firing was performed in air at 550° C. to form a barrier rib having a barrier rib top width of 35 μm, barrier rib bottom width of 65 μm, barrier rib height of 450 μm and a size of 480 mm×480 mm as a size appropriate to a predetermined number of pixels. A part provided with only the buffer layer had a reflectivity of 69% to light having a wavelength of 550 nm. The porosity of the barrier rib was 2%.

Thereafter, CsI:Tl (CsI:TlI=1 mol:0.003 mol) was filled in spaces divided by the barrier rib, and firing was performed at 580° C. to prepare a scintillator panel 28 having a phosphor volume filling ratio of 60%. Due to distortion of the barrier rib pattern structure, no more phosphor could be filled in spaces divided by the barrier rib.

The substrate warpage amount of the prepared scintillator panel 28 was no less than 80 μm and no more than 100 μm. As a result of evaluating a radiation detector including the prepared scintillator panel 28 and PaxScan2520, the luminance was 88% with respect to Example 1. As to images, image defects occurred at 40 or more locations in the plane.

Comparative Example 2

The buffer layer screen printing paste B was applied to a glass substrate of 500 mm×500 mm (OA-10 manufactured by Nippon Electric Glass Co. Ltd.) in a film thickness of 15 μm by screen printing, and dried to form a buffer layer paste coating film. Next, the barrier rib screen printing paste A was applied onto the buffer layer paste coating film by screen printing. A grid-like barrier rib pattern having a height of 400 μm was obtained by repeating, ten times, application and drying with a film thickness of 40 μm per application using as a screen plate a screen having grid-like pattern with pitches of 127 μm in longitudinal and traverse directions, an opening length of 92 μm×92 μm, a barrier rib width of 35 μm and a size appropriate to a predetermined number of pixels. Thereafter, the buffer layer paste coating film and the barrier rib pattern were simultaneously fired at 585° C. for 15 minutes in air at 550° C. to form a barrier rib member having a grid-like barrier rib with a barrier rib pitch of 127 μm, a barrier rib top width of 35 μm, a barrier rib bottom width of 55 μm, a barrier rib height of 340 μm and a size of 480 mm×480 mm. A part provided with only the buffer layer had a reflectivity of 65% to light having a wavelength of 550 nm. The porosity of the barrier rib was 1.5%.

Thereafter, CsI:Tl (CsI:TlI=1 mol:0.003 mol), as a phosphor, was filled in spaces divided by the barrier rib, and firing was performed at 580° C. to prepare a scintillator panel 29 having a phosphor volume filling ratio of 65%. The substrate warpage amount of the scintillator panel 29 was no less than 80 μm and no more than 100 μm. As a result of evaluating the prepared scintillator panel 29, the luminance was only 88% with respect to Example 1. The luminance variation was 7.5%, and image defects occurred at 35 locations in the plane.

Comparative Example 3

A barrier rib member was prepared in the same manner as in Comparative Example 2 except that the barrier rib screen printing paste B was used. The barrier rib of the obtained barrier rib member was a grid-like barrier rib with a barrier rib pitch of 127 μm, a barrier rib top width of 35 μm, a barrier rib bottom width of 55 μm, a barrier rib height of 350 μm and a size of 480 mm×480 mm. A part provided with only the buffer layer had a reflectivity of 65% to light having a wavelength of 550 nm. The porosity of the barrier rib was 4.1%.

Thereafter, CsI:Tl (CsI:TlI=1 mol:0.003 mol) was filled in spaces divided by the barrier rib, and firing was performed at 580° C. to prepare a scintillator panel 30 having a phosphor volume filling ratio of 60%. The substrate warpage amount of the scintillator panel 30 was no less than 60 μm and no more than 70 μm. As a result of evaluating the prepared scintillator panel 30, the luminance was only 90% with respect to Example 1. The luminance variation was 6.5%, and image defects occurred at 35 locations in the plane.

Comparative Example 4

A barrier rib member was prepared in the same manner as in Example 2 except that the barrier rib photosensitive paste M was used, and firing was performed at 710° C. for 20 minutes. The barrier rib of the obtained barrier rib member was a grid-like barrier rib with a barrier rib pitch of 127 μm, a barrier rib top width of 35 μm, a barrier rib bottom width of 48 μm, a barrier rib height of 380 μm and a size of 480 mm×480 mm. A part provided with only the buffer layer had a reflectivity of 53% to light having a wavelength of 550 nm. The porosity of the barrier rib was 30%. The obtained panel was significantly distorted to the extent that the amount of warpage was no less than 700 μm and no more than 800 μm, and chipping and cracking of the barrier rib occurred, so that production as a panel could not be accomplished.

Comparative Example 5

A barrier rib member was prepared in the same manner as in Example 2 except that the barrier rib photosensitive paste N was used, and firing was performed at 530° C. for 15 minutes. The barrier rib of the obtained barrier rib member was a grid-like barrier rib with a barrier rib pitch of 127 μm, a barrier rib top width of 35 μm, a barrier rib bottom width of 100 μm, a barrier rib height of 280 μm and a size of 480 mm×480 mm. A part provided with only the buffer layer had a reflectivity of 75% to light having a wavelength of 550 nm, but sintering of the low-melting point glass of the buffer paste did not proceed, and the interface between the barrier rib and the buffer layer was cracked. The porosity of the barrier rib was 1%.

Thereafter, CsI:Tl (CsI:TlI=1 mol:0.003 mol), as a phosphor, was filled in spaces divided by the barrier rib, and firing was performed at 580° C. to prepare a scintillator panel 31 having a phosphor volume filling ratio of 80%. The substrate warpage amount of the scintillator panel 31 was no less than 250 μm and no more than 300 μm. However, the barrier rib division was deformed, and a phosphor was stuck on the top of the barrier rib. As a result of evaluating the prepared scintillator panel 31, the luminance was only 75% with respect to Example 1. The luminance variation was 9.8%, and image defects occurred at 50 locations in the plane.

From the results described above, it is apparent that in examples according to the present invention, a radiation detector is obtained which has a high light emission luminance, and reduced barrier rib structure distortion, image unevenness and linear noises, and allows proper images to be obtained.

DESCRIPTION OF REFERENCE SIGNS

1 Radiation detector
2 Scintillator panel
3 Output substrate
4 Substrate
5 Buffer layer
6 Barrier rib
7 Scintillator layer
8 Diaphragm layer
9 Photoelectric conversion layer
10 Output layer
11 Substrate
12 Power supply portion

The invention claimed is:

1. A scintillator panel comprising: a plate-like substrate; a grid-like barrier rib provided on the substrate; and a scintillator layer composed of a phosphor filled in cells divided by the barrier rib, wherein the barrier rib is formed of a material which is mainly composed of a low-melting-point glass containing 2 to 20% by mass of an alkali metal oxide, wherein the barrier rib has a height of 250 to 500 μm.

2. The scintillator panel according to claim 1, wherein the volume fraction of the phosphor to the space volume in the cells divided by the barrier rib is 55% to 100%.

3. The scintillator panel according to claim 1, wherein the thermal expansion coefficient of the low-melting-point glass is 40 to 70×10$^{-7}$ (/K).

4. The scintillator panel according to claim 1, wherein the barrier rib includes pores, and when the ratio of a pore part to the whole barrier rib is defined as a porosity, the porosity is in a range of 2 to 25% by volume.

5. The scintillator panel according to claim 1, wherein the scintillator panel further comprises a buffer layer composed of an inorganic component selected from a low-melting-point glass and a ceramic between the barrier rib and the substrate, and the buffer layer has a reflectivity of 60% or more to light having a wavelength of 550 nm.

6. A method for manufacturing a barrier rib member having a plate-like substrate, and a grid-like barrier rib provided on the substrate, the method comprising:

a step of forming a photosensitive paste coating film by applying onto a substrate a photosensitive paste which contains a low-melting-point glass powder containing 2 to 20% by mass of an alkali metal oxide, and a photosensitive organic component;

a step of exposing the obtained photosensitive paste coating film to light through a photomask having a predetermined opening;

a development step of dissolving and removing a part of the exposed photosensitive paste coating film which is soluble in a developer to obtain a photosensitive paste coating film pattern; and a firing step of heating the photosensitive paste coating film pattern after development to 500° C. to 700° C. to remove the organic component and soften and sinter the low-melting-point glass and thereby forming a barrier rib, wherein the barrier rib has a height of 250 to 500 μm.

7. The method for manufacturing a barrier rib member according to claim 6, wherein an average refractive index n1 of the low-melting-point glass powder contained in the photosensitive paste and an average refractive index n2 of the photosensitive organic component contained in the photosensitive paste satisfy −0.1<n1−n2<0.1.

8. A method for manufacturing a scintillator panel comprising a plate-like substrate, a grid-like barrier rib provided on the substrate, and a scintillator layer composed of a phosphor filled in cells divided by the barrier rib, the method comprising:

a step of forming a photosensitive paste coating film by applying onto a substrate a photosensitive paste which contains a low-melting-point glass powder containing 2 to 20% by mass of an alkali metal oxide, and a photosensitive organic component;

a step of exposing the obtained photosensitive paste coating film to light through a photomask having a predetermined opening;

a development step of dissolving and removing a part of the exposed photosensitive paste coating film which is soluble in a developer to obtain a photosensitive paste coating film pattern;

a firing step of heating the photosensitive paste coating film pattern after development to 500° C. to 700° C. to remove the organic component and soften and sinter the low-melting-point glass and thereby forming a barrier rib, wherein the barrier rib has a height of 250 to 500 μm; and a step of filling a phosphor in cells divided by the barrier rib.

9. The method for manufacturing a scintillator panel according to claim 8, wherein an average refractive index n1 of the low-melting-point glass powder contained in the photosensitive paste and an average refractive index n2 of the photosensitive organic component contained in the photosensitive paste satisfy −0.1<n1−n2<0.1.

10. A method for manufacturing a scintillator panel comprising a plate-like substrate, a buffer layer provided on the substrate, a grid-like barrier rib provided on the buffer layer, and a scintillator layer composed of a phosphor filled in cells divided by the barrier rib, the method comprising:

a step of forming a buffer layer paste coating film by applying onto a substrate a buffer layer paste which contains an inorganic powder selected from a low-melting-point glass powder and a ceramic powder, and a photosensitive organic component;

a step of exposing the entire surface of the buffer layer paste coating film to light;

a step of forming a barrier rib photosensitive paste coating film by applying onto the exposed buffer layer paste coating film a barrier rib photosensitive paste which contains a low-melting-point glass powder containing 2 to 20% by mass of an alkali metal oxide, and a photosensitive organic component;

a step of exposing the obtained barrier rib photosensitive paste coating film to light through a photomask having a predetermined opening;

a development step of dissolving and removing a part of the exposed photosensitive paste coating film which is soluble in a developer to obtain a photosensitive paste coating film pattern;

a firing step of heating the buffer layer paste coating film and the photosensitive paste coating film pattern after development to 500° C. to 700° C. to remove the organic component and soften and sinter the low-melting-point glass and thereby forming a buffer layer and a barrier rib at the same time, wherein the barrier rib has a height of 250 to 500 μm; and a step of filling a phosphor in cells divided by the barrier rib.

11. The method for manufacturing a scintillator panel according to claim 10, wherein an average refractive index n1 of the low-melting-point glass powder contained in the photosensitive paste and an average refractive index n2 of the photosensitive organic component contained in the photosensitive paste satisfy $-0.1<n1-n2<0.1$.

* * * * *